United States Patent
Willcox et al.

(10) Patent No.: US 6,425,290 B2
(45) Date of Patent: Jul. 30, 2002

(54) OIL-LESS DIFFERENTIAL PRESSURE SENSOR

(75) Inventors: Charles R. Willcox, Eden Prairie; Mark A. Lutz, Minneapolis; Mark G. Romo, Eden Prairie; Stanley E. Rud, Jr., Victoria, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/780,033

(22) Filed: Feb. 9, 2001

Related U.S. Application Data
(60) Provisional application No. 60/181,866, filed on Feb. 11, 2000.

(51) Int. Cl.[7] .............................................. G01L 7/08
(52) U.S. Cl. ...................................................... 73/715
(58) Field of Search ........................ 73/718, 724, 756, 73/715–717, 719–723, 725–727; 338/2, 4, 42; 361/583.1–283.4

(56) References Cited

U.S. PATENT DOCUMENTS

| | | | |
|---|---|---|---|
| 3,479,879 A | 11/1969 | Music | 73/398 |
| 3,965,746 A | 6/1976 | Rabek | 73/398 |
| 4,260,883 A | 4/1981 | Onoda et al. | 250/226 |
| 4,269,069 A | 5/1981 | Handtmann et al. | 73/705 |
| 4,301,492 A | 11/1981 | Paquin et al. | 361/283 |
| 4,336,567 A | 6/1982 | Anastasia | 361/283 |
| 4,366,716 A | 1/1983 | Yoshida | 73/718 |
| 4,388,833 A | 6/1983 | Kuwayama | 73/718 |
| 4,458,537 A | 7/1984 | Bell et al. | 73/718 |
| 4,475,405 A | 10/1984 | Corpron et al. | 73/861.24 |
| 4,507,973 A | 4/1985 | Barr et al. | 73/724 |
| 4,523,474 A | 6/1985 | Browne et al. | 73/724 |
| 4,562,742 A | 1/1986 | Bell | 73/718 |
| 4,574,327 A | 3/1986 | Wilner | 361/283 |
| 4,594,504 A | 6/1986 | Coursolle et al. | 250/227 |
| 4,612,810 A | 9/1986 | Martens | 73/705 |
| 4,620,093 A | 10/1986 | Barkhoudarian et al. | 250/231 |
| 4,626,680 A | 12/1986 | Martens et al. | 250/231 |
| 4,680,971 A | 7/1987 | Kavli et al. | 73/718 |
| 4,729,240 A | 3/1988 | Sugihara et al. | 73/705 |
| 4,735,098 A | 4/1988 | Kavli et al. | 73/718 |
| 4,873,870 A | 10/1989 | Delatorre | 73/733 |
| 4,884,450 A | 12/1989 | Greenwood et al. | 73/702 |
| 4,899,046 A | 2/1990 | Wright et al. | 250/227 |
| 4,933,545 A | 6/1990 | Saaski et al. | 250/227.14 |
| 5,009,107 A | 4/1991 | Grasdepot | 73/705 |

(List continued on next page.)

FOREIGN PATENT DOCUMENTS

| | | |
|---|---|---|
| DE | 43 33 753 A1 | 5/1994 |
| DE | 196 17 696 A1 | 11/1997 |
| DE | 198 24 778 A1 | 10/1999 |
| JP | 56162027 | 12/1981 |
| JP | 6-300650 | 10/1994 |
| WO | WO 99/66299 | 12/1999 |

*Primary Examiner*—William Oen
(74) *Attorney, Agent, or Firm*—Westman, Champlin & Kelly

(57) ABSTRACT

A pressure sensor is provided for measuring a pressure difference between two fluids which does not require isolation fluid. The pressure sensor includes a diaphragm support member having an outer periphery and diaphragms coupled thereto. Movement of the diaphragms are the movement of a moveable member. The movement can be sensed to determine the applied differential pressure. The coupling member is joined to the outer periphery with a web. The web is recessed from opposed outwardly facing surfaces of the outer periphery, and first and second diaphragms disposed on opposite sides of the diaphragm support member. Each diaphragm is joined to the outer periphery and to the coupling member.

22 Claims, 21 Drawing Sheets

U.S. PATENT DOCUMENTS

| | | | |
|---|---|---|---|
| 5,022,270 A | 6/1991 | Rud, Jr. ........................ | 73/706 |
| 5,105,665 A | 4/1992 | Parsons et al. ................ | 73/704 |
| 5,134,887 A | 8/1992 | Bell ............................ | 73/718 |
| 5,152,173 A | 10/1992 | Willson ........................ | 73/702 |
| 5,155,653 A | 10/1992 | Kremidas .................... | 361/283 |
| 5,166,679 A | 11/1992 | Vranish et al. ......... | 340/870.37 |
| 5,186,054 A | 2/1993 | Sekimura ..................... | 73/724 |
| 5,195,374 A | 3/1993 | Parsons et al. ................ | 73/704 |
| 5,247,171 A | 9/1993 | Wlodarczyk et al. .. | 250/227.21 |
| 5,252,826 A | 10/1993 | Kemp ................... | 250/231.19 |
| 5,293,046 A | 3/1994 | Wheatley ................ | 250/458.1 |
| 5,317,918 A | 6/1994 | Lew ............................. | 73/718 |
| 5,323,656 A | 6/1994 | Fung et al. .................... | 73/718 |
| 5,333,504 A | 8/1994 | Lutz et al. .................... | 73/727 |
| 5,385,053 A | 1/1995 | Wlodarczyk et al. ......... | 73/704 |
| 5,422,478 A | 6/1995 | Wlodarczyk et al. ........ | 250/227 |
| 5,431,057 A | 7/1995 | Zimmer et al. ................ | 73/724 |
| 5,442,347 A | 8/1995 | Vranish .................. | 340/870.37 |
| 5,479,827 A | 1/1996 | Kimura et al. ................. | 73/718 |
| 5,485,345 A | 1/1996 | Lukasiewicz et al. .... | 261/283.3 |
| 5,486,976 A | 1/1996 | Charboneau et al. .... | 361/283.4 |
| 5,675,086 A | 10/1997 | Kihara et al. .................. | 73/718 |
| 5,760,310 A | 6/1998 | Rud, Jr. et al. ................ | 73/706 |
| 5,763,769 A | 6/1998 | Kluzner ....................... | 73/115 |
| 5,917,180 A | 6/1999 | Reimer et al. .......... | 250/227.14 |
| 5,936,235 A | 8/1999 | Minamitani et al. ... | 250/227.16 |
| 5,999,319 A | 12/1999 | Castracane .................. | 359/573 |
| 6,122,971 A | 9/2000 | Wlodarczyk .................. | 73/705 |

OIL-LESS DIFFERENTIAL PRESSURE SENSOR

The present application is based on and claims the benefit of U.S. provisional patent application Serial No. 60/181,866, filed Feb. 11, 2000, the content of which is hereby incorporated by reference in its entirety.

BACKGROUND OF THE INVENTION

The present invention relates to differential pressure sensors. More specifically, the present invention relates to differential pressure sensors which measure pressure based upon diaphragm deflection.

Pressure sensors are used to measure pressures. A differential pressure sensor is configured to respond to a differential pressure, that is, the difference between two pressures.

One technique which is used to measure differential pressure is through a deflectable diaphragm. A first pressure is applied to one side of the diaphragm and a second pressure is applied to the other side of the diaphragm. The deflection of the diaphragm is proportional to the difference between the two applied pressures. Diaphragm deflection can be measured by configuring the diaphragm so that it acts as a plate of a capacitor. The capacitance of the diaphragm assembly changes based upon the diaphragm position. Therefore, capacitance can be related to diaphragm position which in turn is representative of the differential pressure applied to the diaphragm.

Pressure sensors frequently operate in harsh environments. Such environments can cause failure in highly accurate pressure sensors which tend to be quite delicate. One technique which has been used to isolate the pressure sensor is to isolate the pressure sensor from the fluid (also called "process fluid") whose pressure is being measured. One such technique uses an isolation diaphragm in which process fluid is on one side of isolation diaphragm and isolation fluid is on the other side. The isolation fluid contacts the pressure sensor diaphragm. As the process fluid pressure changes, the isolation diaphragm, responsively deflects which causes the change in pressure to be transferred through the isolation fluid to the sensor diaphragm. However, the isolation fluid in the diaphragm can introduce errors in pressure measurements and can be altered over time or due to application of heat or other external influences. Further, the fluid can leak with time which can result in reduced fluid volume or fill fluid which has been contaminated by process fluid.

SUMMARY OF THE INVENTION

A pressure sensor is provided for measuring a pressure difference between two fluids which does not require isolation fluid. The pressure sensor includes a diaphragm support member having an outer periphery and diaphragms coupled thereto. Movement of the diaphragms are the movement of a moveable member. The movement can be sensed to determine the applied differential pressure. The coupling member is joined to the outer periphery with a web. The web is recessed from opposed outwardly facing surfaces of the outer periphery, and first and second diaphragms disposed on opposite sides of the diaphragm support member. Each diaphragm is joined to the outer periphery and to the coupling member.

DETAILED DESCRIPTION OF THE PREFERRED EMBODIMENTS

Figure 1:
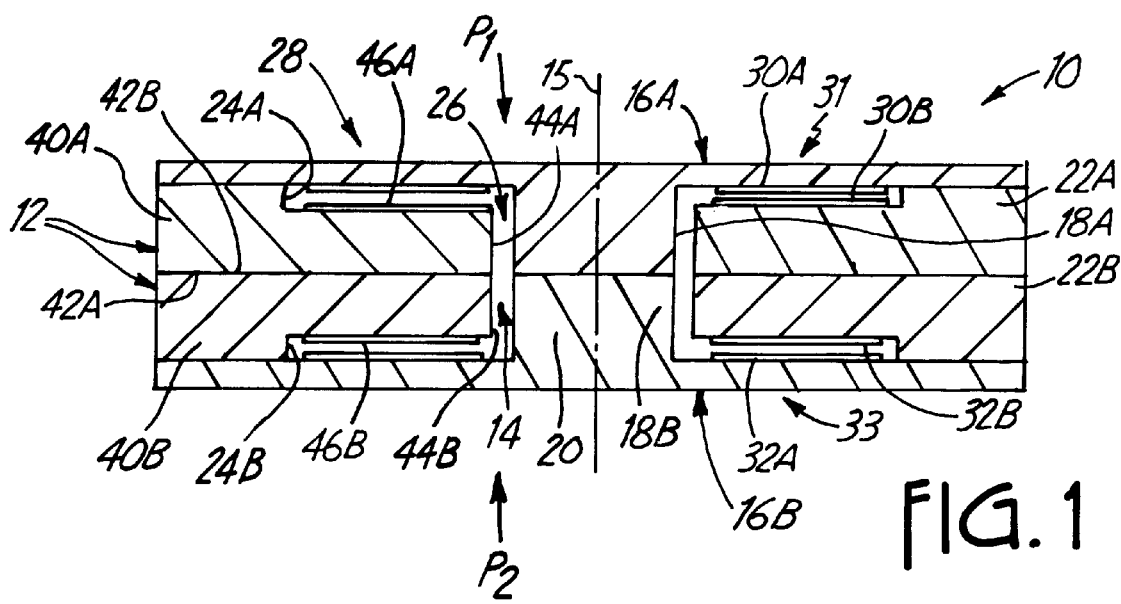
FIG. 1 is a side cross-sectional view of a pressure sensor in accordance with one embodiment.

A first embodiment of an oil-less pressure sensor is indicated at 10. Generally, the pressure sensor 10 includes two diaphragm support structures 12 having bore 14. Isolator diaphragms 16A and 16B are mounted to opposite sides of the diaphragm support structure 12, while in the embodiment illustrated, portions 18A and 18B are secured together to form a rigid coupling moveable member 20 extending within the bore 14. In addition, the isolator diaphragms 16A and 16B are secured, the diaphragm support structure 12 on outer peripheries or rims 22A and 22B to form corresponding annular cavities 24A and 24B that open to and are about an axis 15 of the bore 14. The annular cavities 24A and 24B provide space between opposed surfaces of each of the isolator diaphragms 16A and 16B, and the diaphragm support structure 12. This, in turn, allows the isolator diaphragms 16A and 16B to deflect relative to the diaphragm support structure 12 in response to a difference in pressures $P_1$ and $P_2$, while providing inherent overtravel protection. The rigid coupling member 20 formed by portions 18A and 18B couples the isolator diaphragms 16A and 16B together and replaces an incompressible fluid commonly used in differential pressure sensors.

The diaphragm support structure 12 and the isolator diaphragms 16A and 16B define a cavity 26 comprising the bore 14 and annular cavities 24A and 24B that can be completely isolated and sealed from the external environment. The inside of the cavity 26 can be evacuated or filled with an inert gas. However, the cavity 26 need not be evacuated and can be left at gauge pressure. Since the cavity 26 is substantially isolated, changes in environmental conditions will have less of an effect on sensing elements mounted within the cavity 26 to measure displacement of the isolator diaphragms 16A and 16B relative to the diaphragm support structure 12. In addition, dust particles cannot easily enter the cavity 26.

In the embodiment illustrated, a capacitive sensing device 28 provides a signal indicative of displacement of each of the isolator diaphragms 16A and 16B relative to the diaphragm support structure 12. The capacitive sensing device 28 includes metallized-ring electrodes 30A, 30B, 32A and 32B that form capacitors 31 and 33. Since isolator diaphragms 16A and 16B are rigidly coupled together through coupling member 20, a capacitance of the capacitor 31 formed by metallized-ring electrodes 30A and 30B varies inversely with a capacitance of the capacitor 33 formed by metallized-ring electrodes 32A and 32B.

It should be understood that capacitive sensing device 28 is but one suitable sensor to measure displacement of isolator diaphragms 16A and 16B relative to diaphragm support structure 12. Other capacitive sensing devices can be used. Other suitable sensing devices that can be used to include piezoresistive or piezoelectric strain gauges, optical or acoustical sensing devices operably coupled to the isolator diaphragms 16A and 16B, and/or the diaphragm support structure 12, as appropriate. An embodiment using an optical sensor is illustrated in co-pending patent application Ser. No. 09/780,148, entitled "OPTICAL PRESSURE SENSOR", filed on even date herewith and herein incorporated by reference.

Figure 1A:
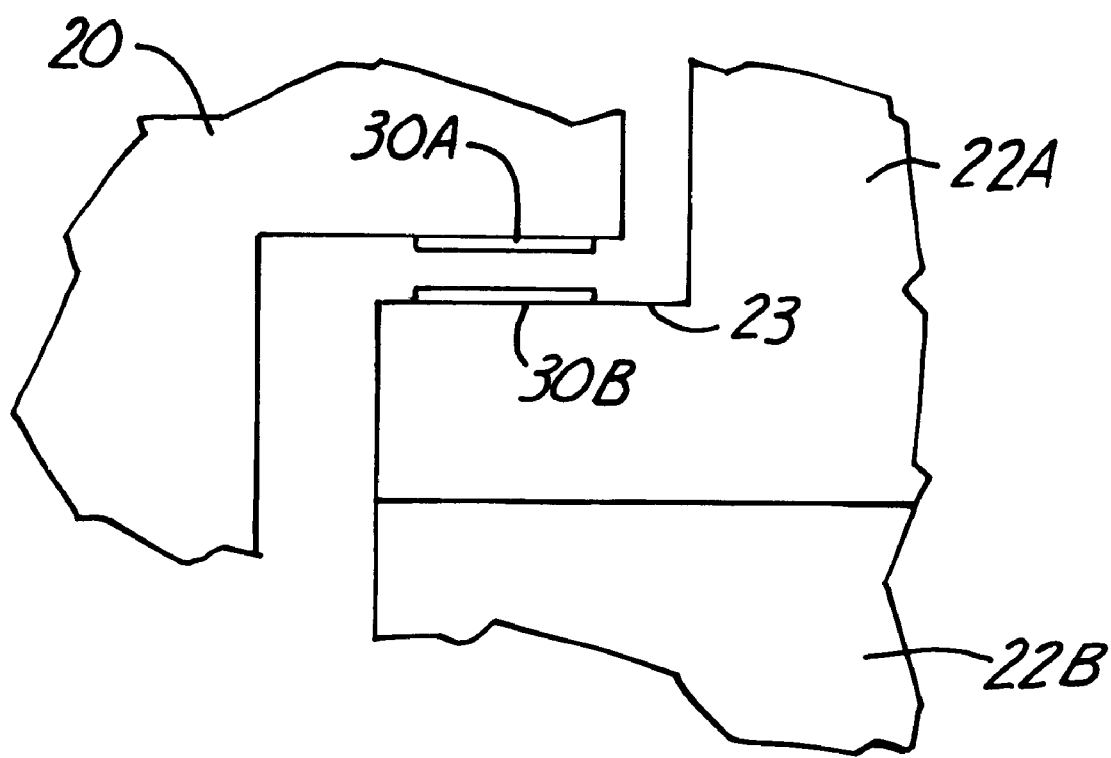
FIG. 1A is an enlarged cross-sectional view showing a portion of a pressure sensor in accordance with another embodiment.

FIG. 1A shows another example of one configuration for capacitive electrodes 30A and 30B. As illustrated in FIG. 1A, a notched region 23 is formed in rims 22A and a complementary ledge is formed in moveable member 20 each carrying electrodes 30B and 30A, respectively. This configuration can be done official because it is not sensitive to errors which can arise into localized deflection in a diaphragm. Such localized deflection can occur in response to a large absolute pressure and are not related to the differential pressure. These localized deflections can cause errors in the configuration shown in FIG. 1. However, in the embodiment shown in FIG. 1A, the electrodes 30A, 30B are positioned such that the capacitance is only sensitive to movement of a moveable member 20.

Preferably, at least the isolator diaphragms 16A and 16B are made of chemically resistant material that does not abrade in order that the isolator diaphragms 16A and 16B can directly receive the process fluids to be measured. For example, the isolator diaphragms 16A and 16B can be made from a single crystal corundum such as "sapphire" or "ruby" containing chromium. The diaphragm support structure 12 can also be made from the same material as the isolator diaphragms 16A and 16B, and can be directly fusion bonded to the isolator diaphragms 16A and 16B on the rims 22A and 22B at a temperature lower than the melting point of the material used to form these components. When crystalline materials, such as sapphire are used, the resulting structure of the pressure sensor 10 behaves elastically without hysteresis. Furthermore, since the diaphragm support structure 12 and the isolator diaphragms 16A and 16B are formed of the same material, stress induced by different rates of thermal expansion is minimized. Other suitable materials include spinels, zirconia and silicon. If the material is conductive, an electrical insulator can be used such as an oxide.

Direct bonding of the rims 22A and 22B to the corresponding isolator diaphragms 16A and 16B typically requires that each of the bonding surfaces be atomically smooth. An alternative method of attachment includes depositing a glass or suitable metallic solder (preferably having a thermal expansion coefficient similar to the diaphragm support structure 12 and the isolator diaphragms 16A and 16B) on the rims 22A and 22B and/or the opposing surfaces of the isolator diaphragms 16A and 16B. By applying heat and pressure, such as in an evacuated press, a seal is formed between the rims 22A and 22B and the corresponding isolator diaphragms 16A and 16B. Since the seal forms an interface layer between the rims 22A and 22B and the isolator diaphragms 16A and 16B, atomically smooth surfaces are not required.

Figure 2:
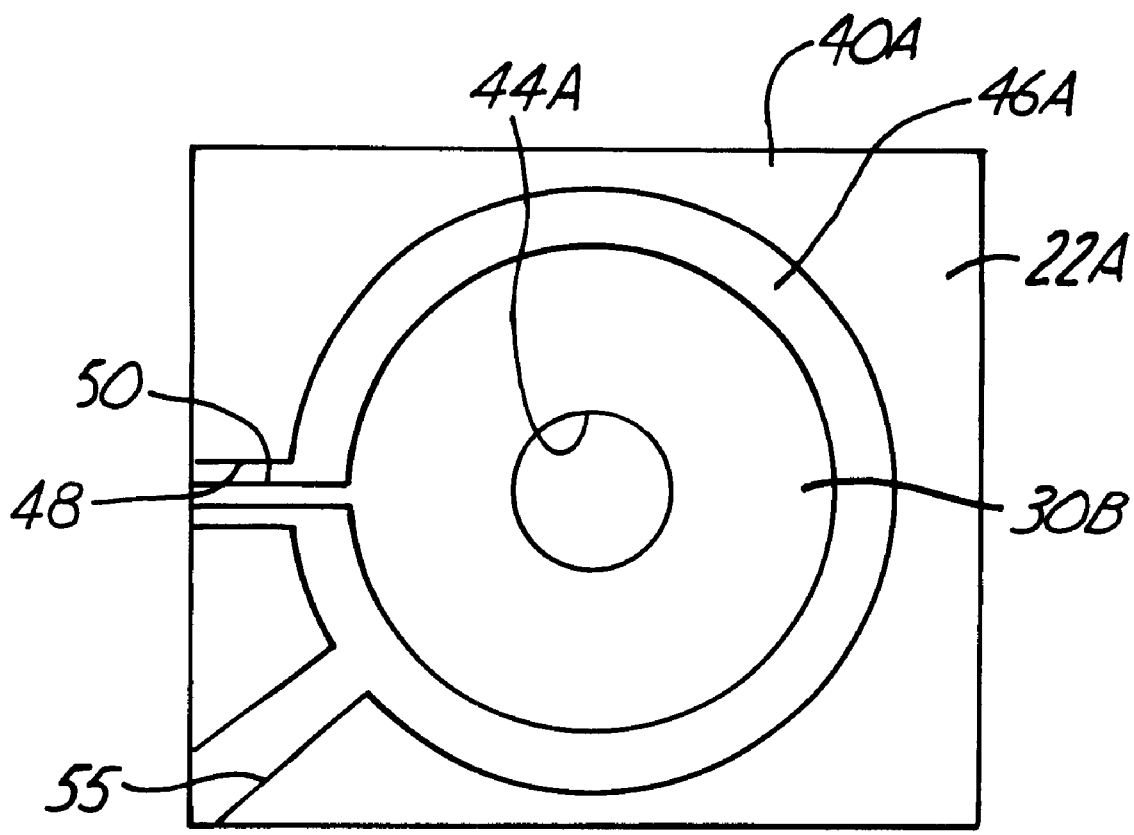
FIGS. 2 and 3 are top plan views of portions of the pressure sensor of FIG. 1.

In the embodiment illustrated, the diaphragm support structure 12 includes substantially identical base members 40A and 40B secured together on planar surfaces 42A and 42B, respectively. Each base member 40A and 40B includes an aperture 44A and 44B, respectively, aligned with each other to form the bore 14. Annular cavities 24A and 24B are formed by providing recessed surfaces 46A and 46B on the base members 40A and 40B below the outer peripheries 22A and 22B and about the apertures 44A and 44B. The metallized-ring electrodes 30B and 32B are provided on the recessed surfaces 46A and 46B, respectively. Referring to FIG. 2, a suitable channel or recess 48 is provided in each of the base member3 40A and 40B to allow a conductive lead 50 to extend from the metallized-ring electrodes 30B and 32B to an outer edge of the pressure sensor 10.

Figure 3:
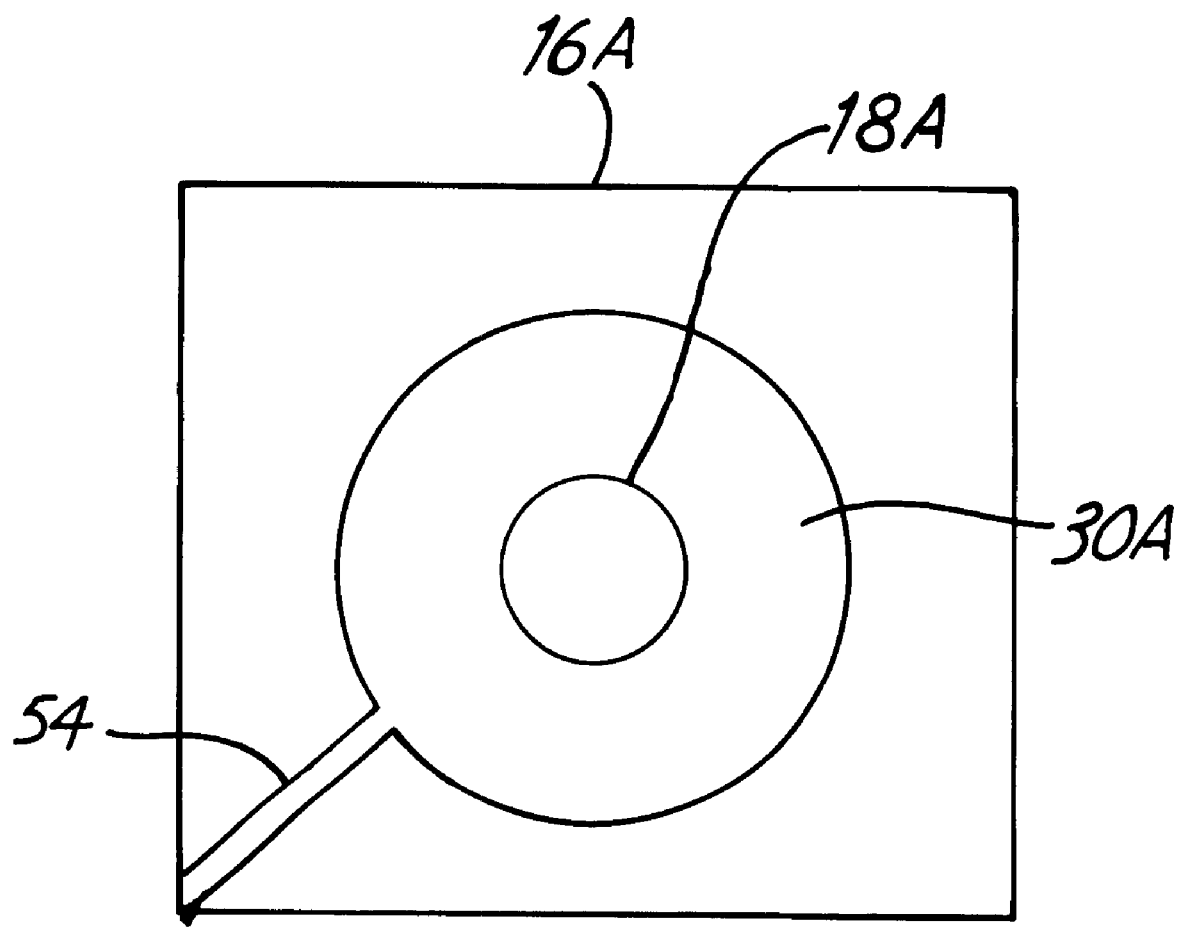

FIGS. 1 and 3 illustrate the isolator diaphragm 16A. The metallized electrode 30A includes a conductive lead 54 that extends through a recess 55 provided in the base member 40A (FIG. 2). Like the base members 40A and 40B, preferably, the isolator diaphragm 16A is substantially identical to the isolator diaphragm 16B. In this manner, only two unique components (i.e. the isolator diaphragms 16A and 16B and the base members 40A and 40B) need be manufactured and assembled to form the pressure sensor 10. As appreciated by those skilled in the art, if desired, the base members 40A and 40B can be simple blocks of material, while the isolator diaphragms 16A and 16B have corresponding rims to form the annular cavities 24A and 24B.

If the pressure sensor 10 is formed from sapphire or other similar crystalline materials, a suitable method of fabrication would include first micro-machining the isolator diaphragms 16A and 16B, and the base members 40A and 40B (or the diaphragm support structure 12 if the base member 40A arid 40B are integrally joined together). Suitable micro-machining techniques include wet or dry chemical etching, and ion or ultrasonic milling techniques. The metallized-ring electrodes 30A, 30B, 32A and 32B can then be deposited on the isolator diaphragms 16A and 16B, and the base members 40A and 40B by a variety of means, for example, electroless plating, evaporation or sputtering. In addition, any or all of the electrodes 30A, 30B, 32A, 32B, and electrodes described below, can comprise ion implanted electrically conductive layers or portions.

The pressure sensor 10 can then be assembled by first securing the isolator diaphragm 16A to the base member 40A, and then securing the isolator diaphragm 16B to the base member 40B. The base members 40A and 40B can then be secured along surfaces 42A and 42B, which would also form the coupling member 20 by securing the portion 18A to the portion 18B. Using separate base members 40A and 40B, which are later bonded together, is particularly advantageous because each of the components, the isolator diaphragms 16A and 16B and the base members 40A and 40B, need only be machined on one side thereof.

It should be understood that although isolator diaphragms 16A and 16B are preferably substantially identical for the reasons discussed above, if desired, the isolator diaphragms 16A and 16B can be machined differently. For example, the portions 18A and 18B can be of different length such that one of the portions 18A or 18B extends further within the bore 14 or out of the bore 14.

Figure 4:
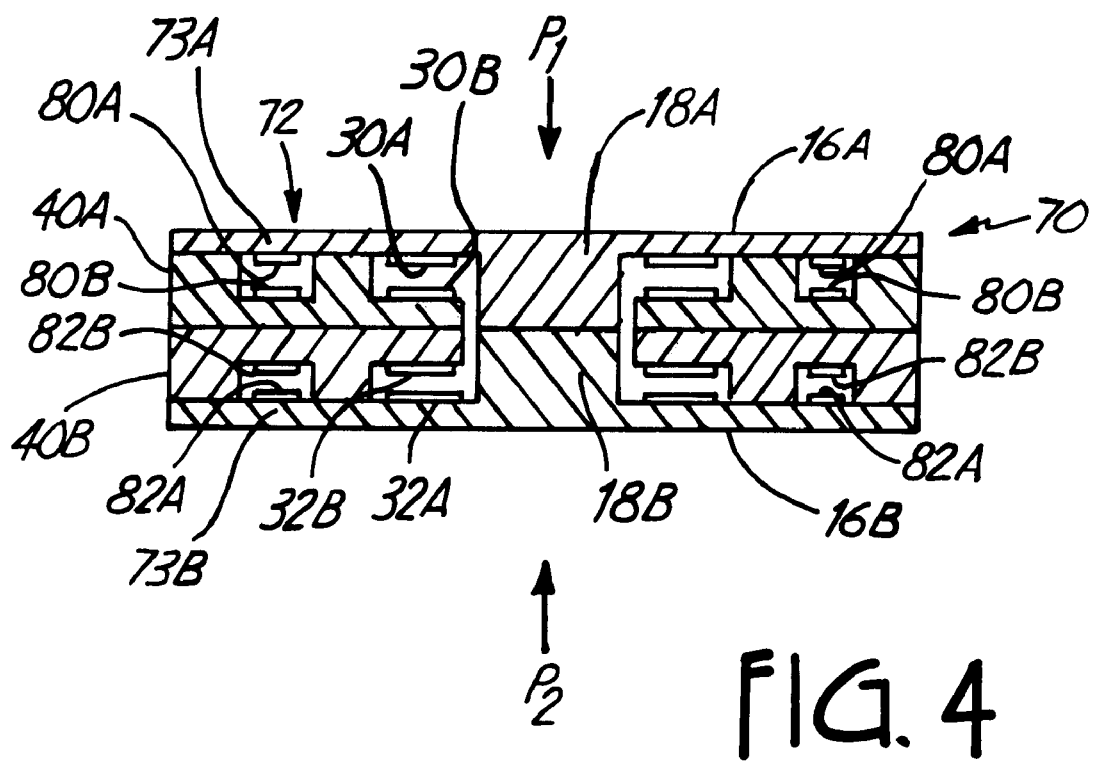
FIG. 4 is a side cross-sectional view of another pressure sensor.
Figure 5:
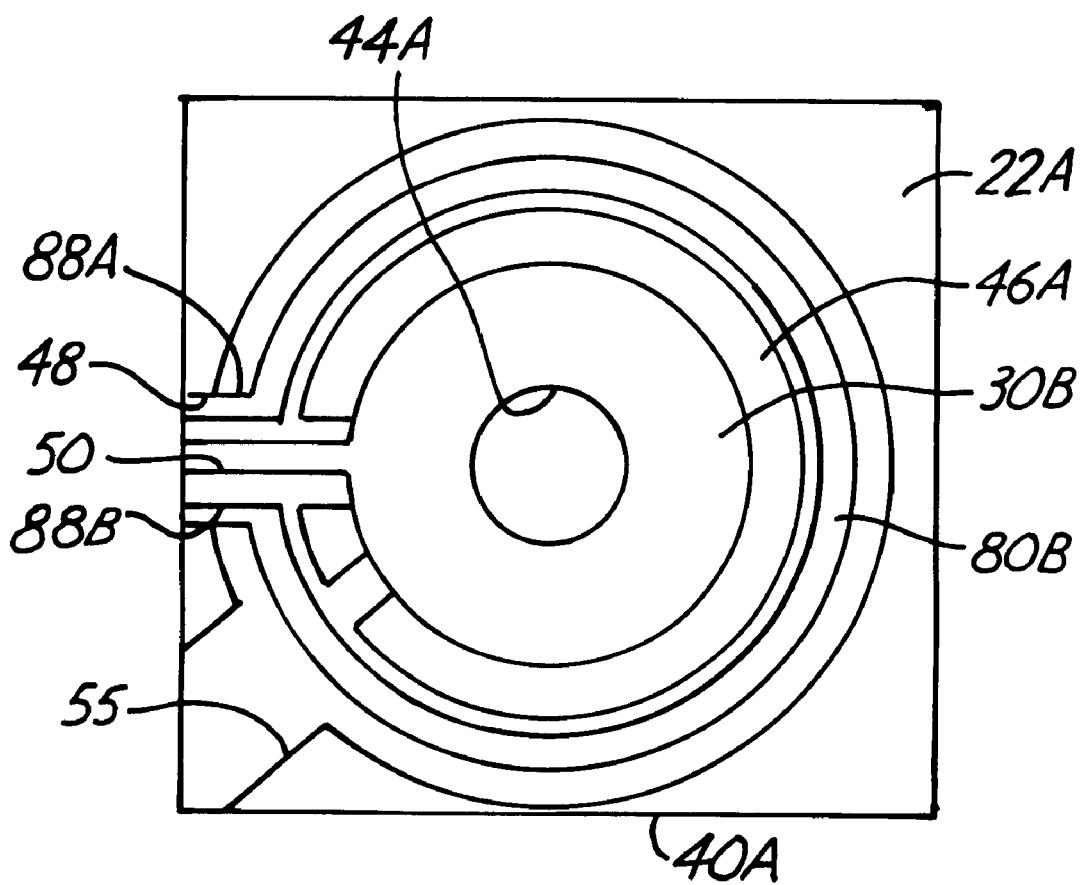
FIGS. 5 and 6 are top plan views of portions of the pressure sensor of FIG. 4.
Figure 6:
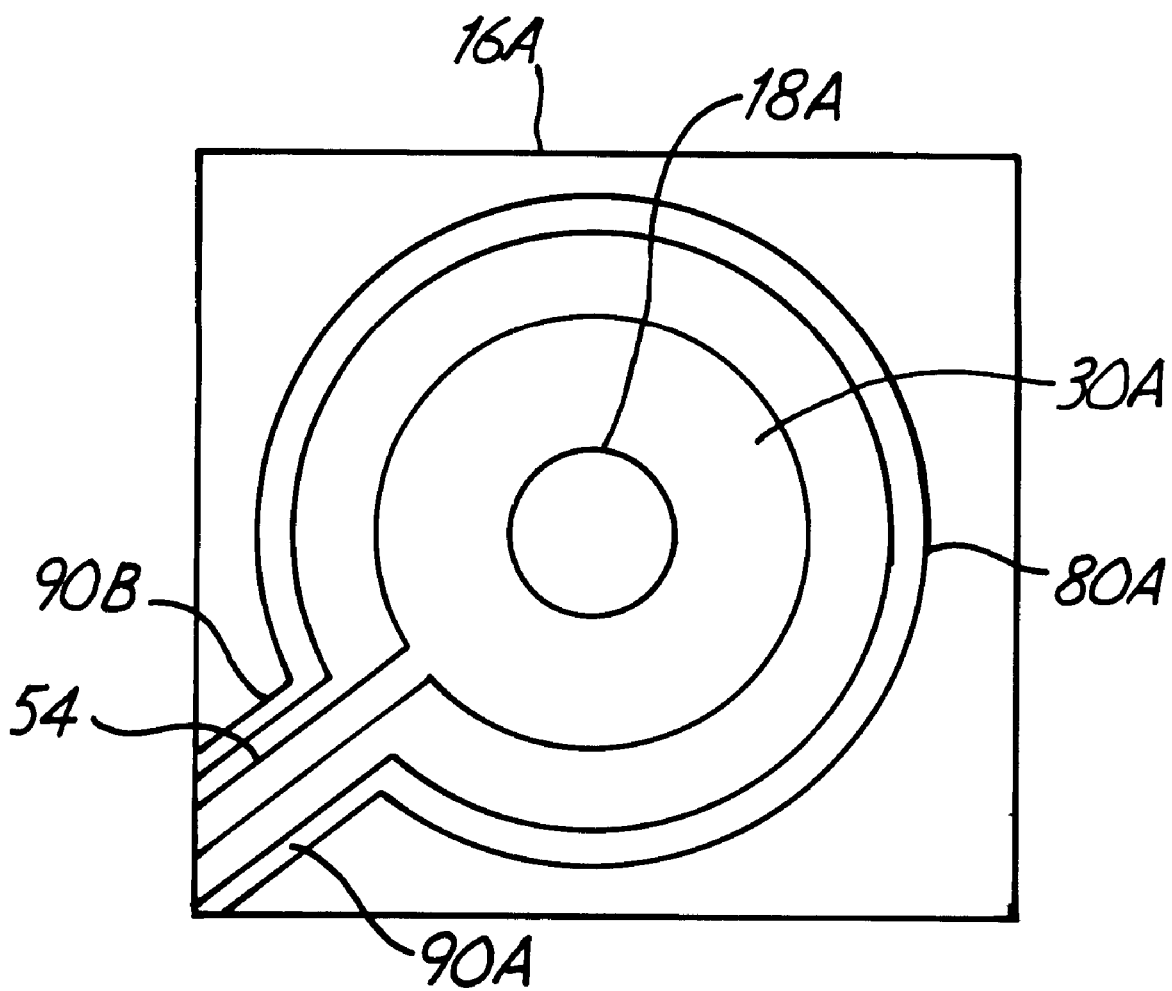

FIGS. 4–6 illustrate a pressure sensor 70 according to a second embodiment of the present invention. Parts corresponding to those in FIGS. 1–3 are designated with the same reference numerals. Briefly, the second embodiment differs from the first embodiment in that the former is provided with a sensing device 72 to provide an output signal indicative of line pressures $P_1$ and $P_2$.

In the embodiment illustrated, the sensing device 72 comprises two capacitors formed by metallized-ring electrodes 80A, 80B, 82A and 82B. The metallized-ring electrodes 80B and 82B are recessed surfaces of base members 40A and 40B, respectively, while the metallized-ring electrodes 80A and 82A are provided on planar surfaces of the isolator diaphragms 16A and 16B to face the metallized-ring electrodes 80B and 82B, respectively. The capacitor formed by metallized-ring electrodes 80A and 80B senses or measures displacement of a portion 73A of the isolator diaphragm 16A relative to the diaphragm support structure 12. Similarly, the capacitor formed by metallized-ring electrodes 82A and 82B senses or measures a portion 73B of the isolator diaphragm 16B relative to the diaphragm support structure 12. Since the diaphragm support structure 12 is fixed or stationary, deflection of the portions 73A or 73B relative to the diaphragm support structure 12 provides an indication of line pressures $P_1$ and $P_2$. If desired, the metallized-ring electrodes 80A and 82A can be provided in suitable recesses in the isolator diaphragms 16A and 16B.

FIG. 5 is a plan view illustrating the position of the metallized-ring electrode 80B upon the base member 40A with respect to the metallized-ring electrode 30B. The metallized-ring electrode 80B includes spaced-apart conductive leads 88A and 88B so as to allow the conductive lead 50 of the metallized-ring electrode 30B to extend therebetween. Similarly, the metallized-ring electrode 80A is positioned as illustrated in FIG. 6 and also includes spaced-apart conductive leads 90A and 90B on either side of the conductive lead 54. if desired, suitable circuitry can be connected to the spaced-apart conductive leads 90A and 90B of the metallized-ring electrode 80A to measure the resistance thereof and provide an indication as to the temperature of the isolator diaphragm 16A, and thus, an indication of the temperature of the process fluid exerting the pressure $P_1$. In the embodiment illustrated, the isolator diaphragm 16B and the base member 40B are substantially identical to the isolator diaphragm 16A and the base member 40A, respectively, so the metallized ring electrode 82A can be used to provide an indication of the temperature of process fluid exerting the pressure $P_2$.

Figure 7:
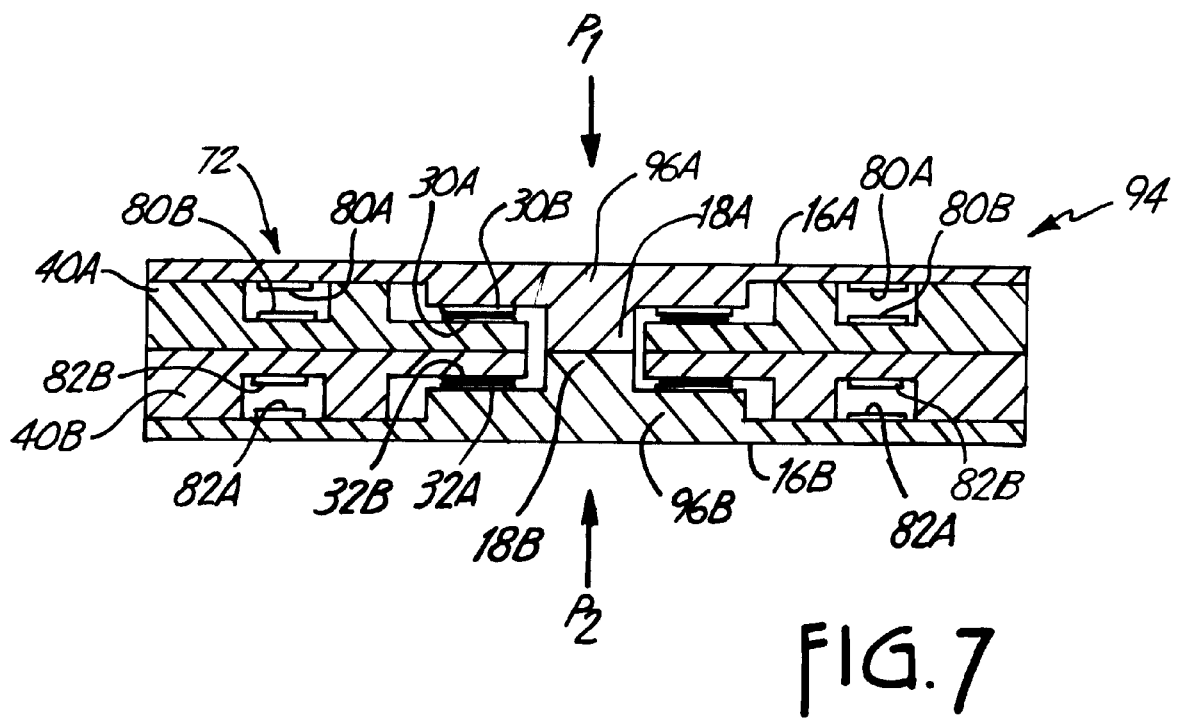
FIG. 7 is a cross-sectional view of pressure sensor in accordance with another embodiment.

FIG. 7 illustrates a pressure sensor according to a third embodiment of the present invention at 94. Parts corresponding to those in FIG. 4 are designated with the same reference numerals. Briefly, the third embodiment differs from the second embodiment in that the former is provided with reinforced isolator diaphragms 16A and 16B. In particular, each isolator diaphragm 16A and 16B includes a center region 96A and 96B, respectively, of increased thickness to minimize high line pressure effects. Portions 18A and 18B extend from the center regions 96A and 96B, respective, and are preferably integrally formed therewith.

Figure 8:
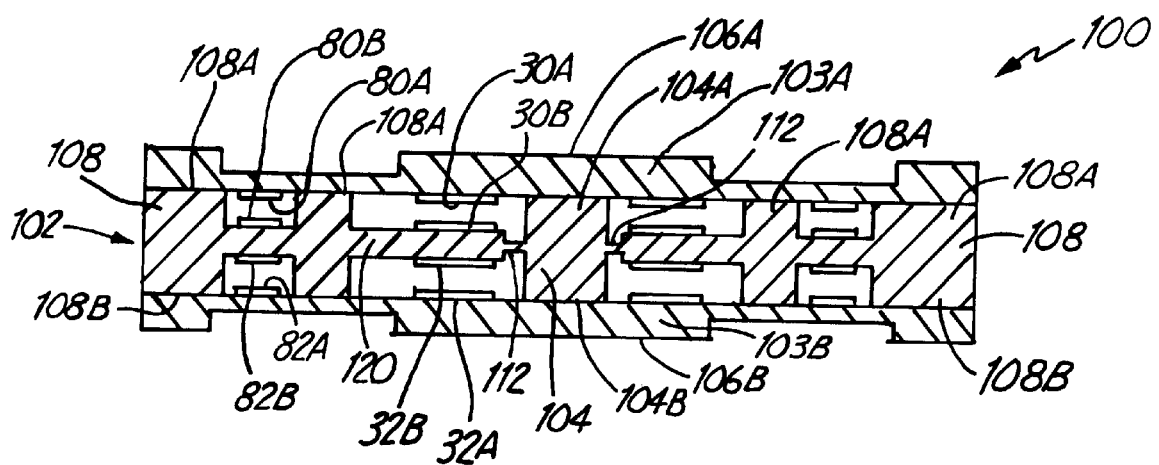
FIG. 8 is a cross-sectional view of pressure sensor in accordance with another embodiment.
Figure 9:
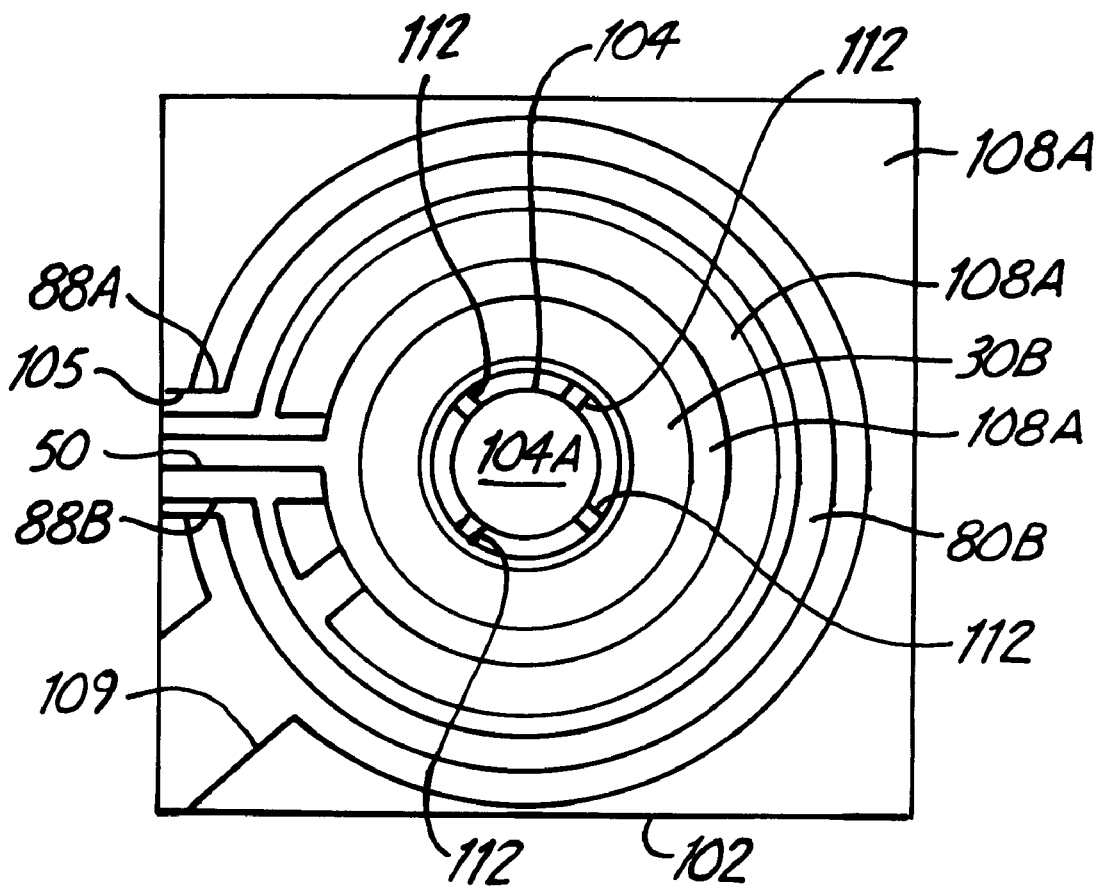
FIGS. 9 and 10 are top plan views of portions of the pressure sensor of FIG. 8.
Figure 10:
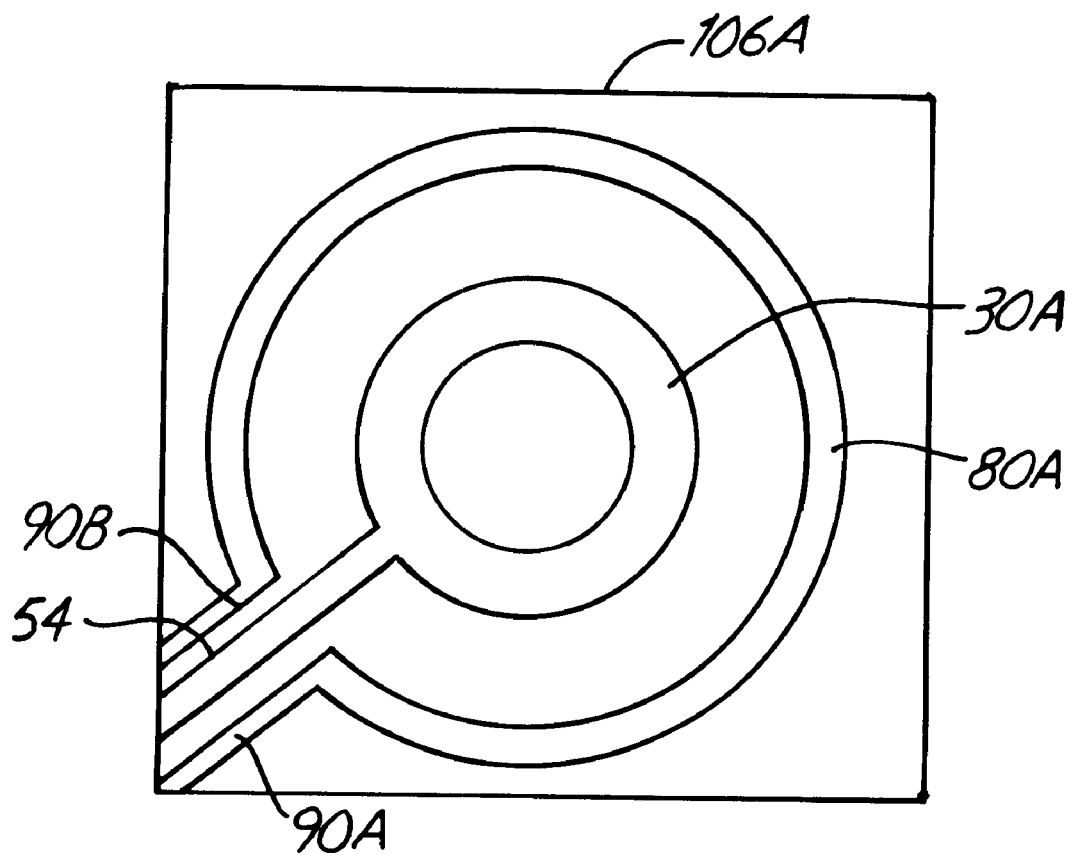

A fourth embodiment of an oil-less pressure sensor is indicated at 100 in FIGS. 8–10. Generally, the oil-less pressure sensor 100 includes a diaphragm support structure 102 having a rigid coupling member 104. Isolator diaphragms 106A and 106B are mounted to opposite sides of the diaphragm support structure 102 and the rigid coupling member 104. The isolator diaphragms 106A and 106B each include center regions 103A and 103B of increased thickness to reduce high line pressure effects. The diaphragms support structure 102 includes an outer periphery or rim 108. The isolator diaphragm 106A is secured to a surface 108A of the outer periphery 108 and to a surface 104A of the rigid coupling member 104. Similarly, the isolator diaphragm 106B is secured to a surface 108B of the outer periphery 108 and a surface 104B of the rigid coupling member 104.

In this embodiment, the oil-less pressure sensor 100 includes three principle components, the diaphragm support structure 102 and the isolator diaphragms 106A and 106B. Accordingly, only two sets of fusion bonds need to be made in order to assemble the oil-less pressure sensor 100 Specifically, a first set of fusion bonds formed at 104A and 108A secure the isolator diaphragm 106A to the rigid coupling member 104 and the outer periphery 108, respectively. A second set of fusion bonds formed at 104B and 108B secure the isolator diaphragm 106B to the rigid coupling member 104 and to the outer periphery 108, respectively.

The metallized-ring electrodes 30A, 30B, 32A, 32B, 80A, 80A, 82A and 82B are positioned substantially as found in the previous embodiment. By way of example, FIG. 9 illustrates the position of the metallized-ring electrodes 30B and 80B with a recess or channel 105 provided for the conductive leads 50, 88A and 88B. Of course, the side of the diaphragm support structure 102 having metallized-ring electrodes 32B and 82B is similarly constructed. FIG. 10 illustrates the position of metallized-ring electrodes 30A and 80A on the isolator diaphragm 106A. A recess or channel 109 (FIG. 9) is provided for the conductive leads 54, 90A and 90B. Isolator diaphragm 106B is constructed substantially identical to isolator diaphragm 106A.

Another aspect of the present invention is further illustrated in FIGS. 8 and 9 wherein the diaphragm support assembly 102 includes at least one thin web 112 extending from the outer periphery 108 to integrally join the rigid coupling member 104 to the outer periphery 108. The web 112 holds the rigid coupling member 104 in position during bonding of the isolator diaphragms 106A and 106B to the rigid coupling member 104. If desired, as illustrated in this embodiment, a plurality of webs 112 extend from different portions of the outer periphery 108. In an alternative embodiment, a solid thin web or disc, not shown, can extend completely around the rigid coupling member 104 and can be used instead of individual webs 112.

In the embodiment illustrated, webs 112 extend from a recessed support 120 that is integrally formed with the outer periphery 108. The recessed support 120 further supports the metallized-ring electrodes 30B and 32B.

If desired, any or all of the webs 112 can be broken after the isolator diaphragms 106A and 106B have been secured to the rigid coupling member 104 in order to reduce stiffness. The webs 112 can be removed using ultrasonic agitation or lasers.

Figure 11:
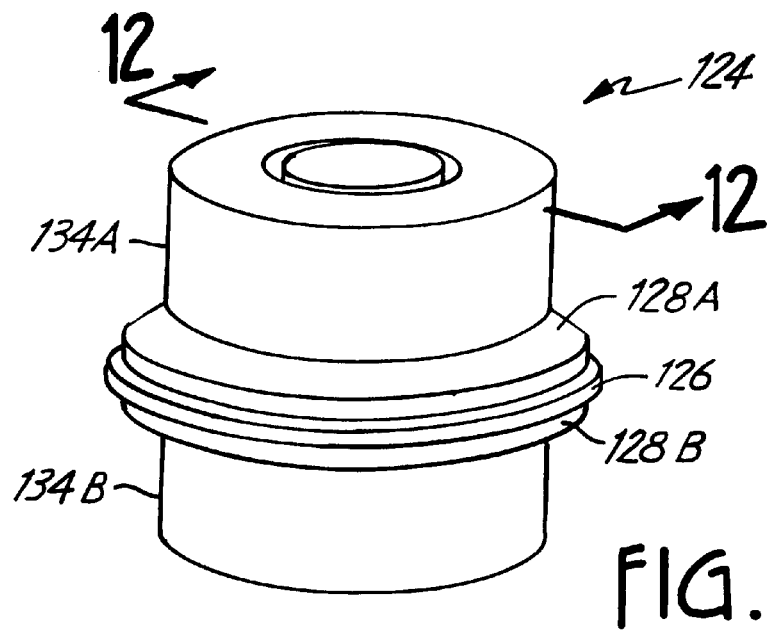
FIG. 11 is a perspective view of a pressure sensor.
Figure 12D:
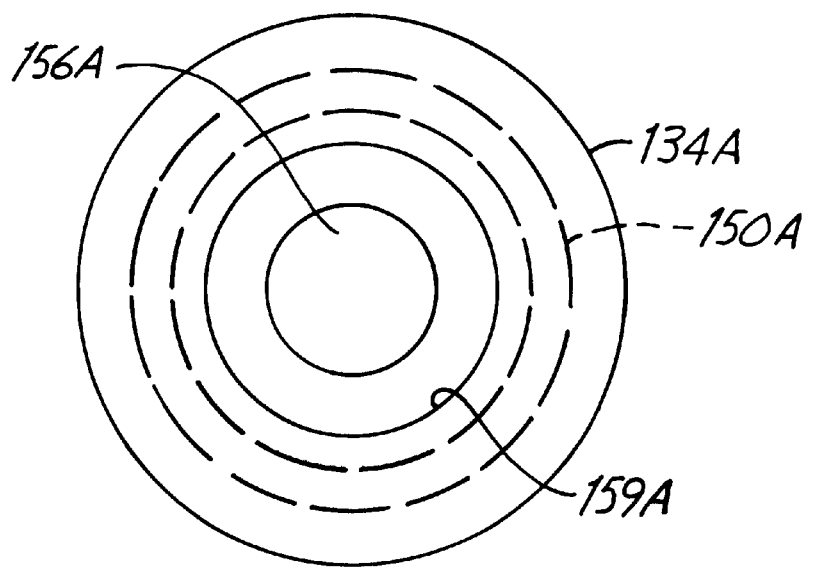
FIGS. 12A, 12B and 12D are top plan views of portions of the pressure sensor of FIG. 11.
Figure 12:
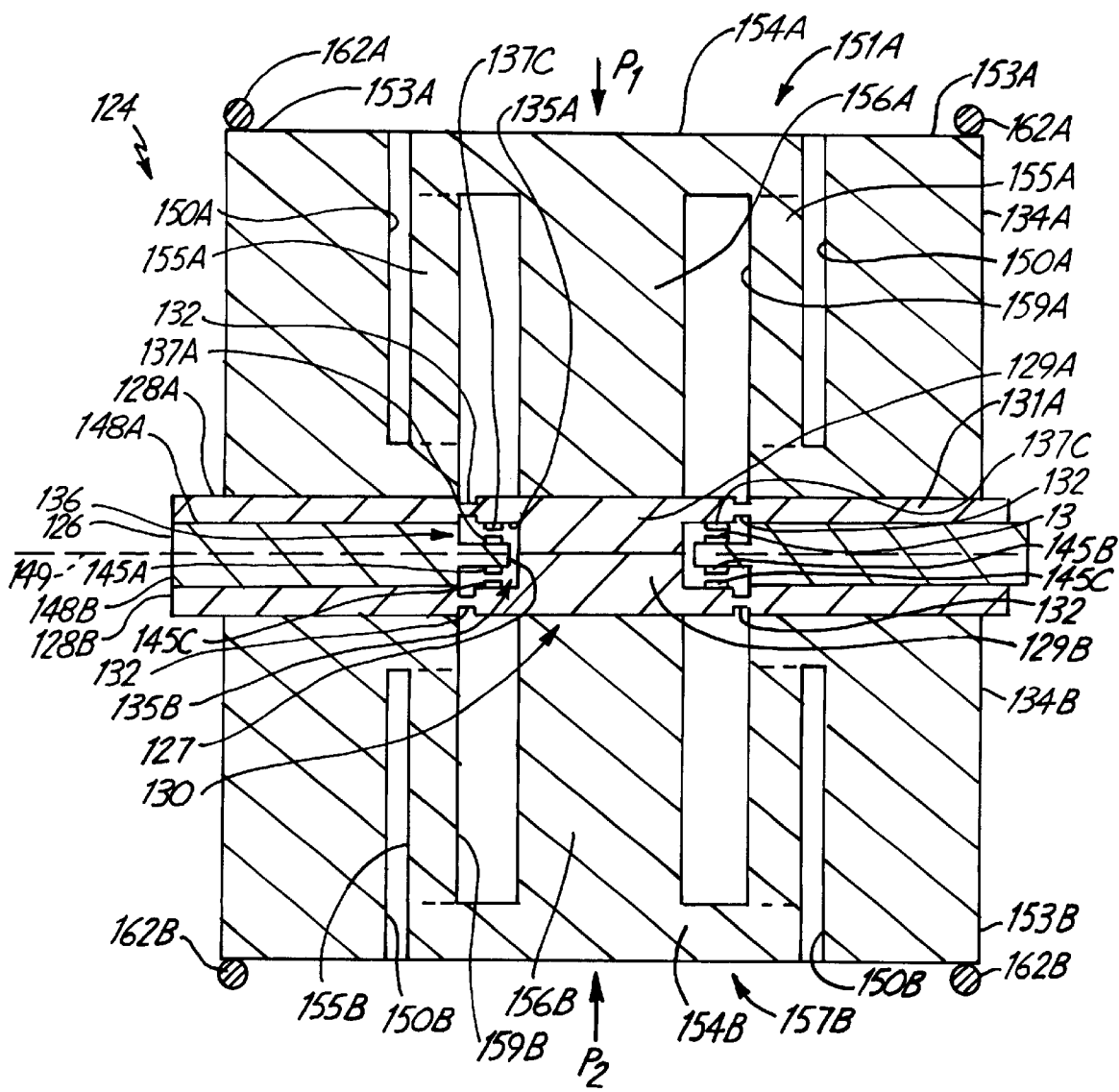
FIG. 12 is a cross-sectional view of the pressure sensor of FIG. 11 taken along the line labeled 12—12.

FIGS. 11 and 12 illustrate a fifth embodiment of an oil-less differential pressure 124 of the present invention. The pressure sensor 124 includes a diaphragm support structure 126 having a bore 127. Isolator diaphragms 128A and 128B are mounted to opposite sides of the diaphragm support structure 126, and have portions 129A and 129B that are secured together to form a rigid coupling member 130 extending within the bore 127. Referring also to FIG. 12A, the portion 129A is integrally joined to an outer periphery portion 131A of the isolator diaphragm 128A with at least one and preferably a plurality of thin webs 132. The webs 132 reduce the stiffness of the isolator diaphragm 128A, allowing it to deflect more easily. In addition, the webs 132 hold the portion 129A in alignment with the portion 29B when the isolator diaphragms 128A and 128B are secured together and to the diaphragm support structure 126. The isolator diaphragm 128B is similarly constructed. After the isolator diaphragms 128A and 128B have been secured to the diaphragm support structure 126, pressure receiving caps 134A and 134B, to be described below, are secured to isolator diaphragms 128A and 128B, respectively. The webs 132 can then be broken in order to separate the rigid coupling member 130 from the isolator diaphragms 128A and 1283.

A capacitive sensing device 136 measures displacement of the rigid coupling member 130. The capacitive sensing device 136 forms two equivalent capacitors 135A and 135B that have capacitance values which vary inversely as a function of the difference in pressure between $P_1$ and $P_2$.

Figure 12B:
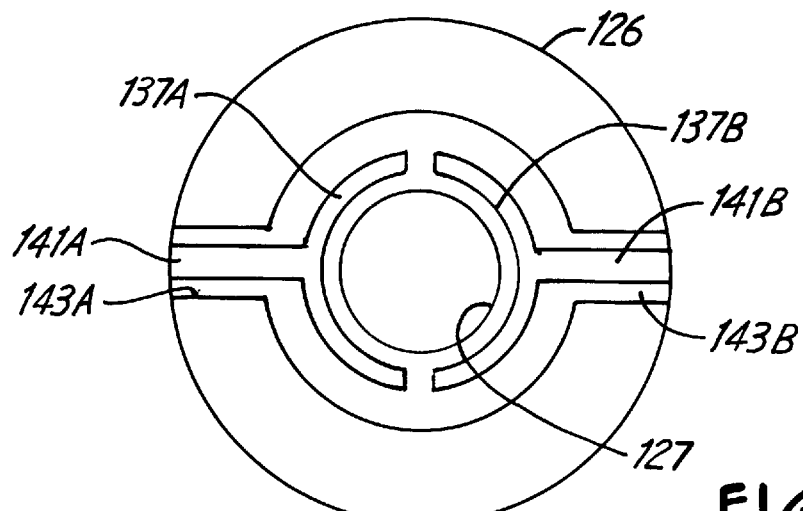
Figure 12C:
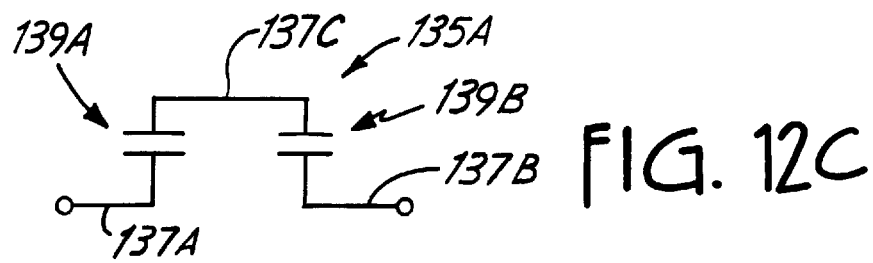
FIG. 12C is a schematic diagram of the pressure sensor of FIG. 11.
Figure 12A:
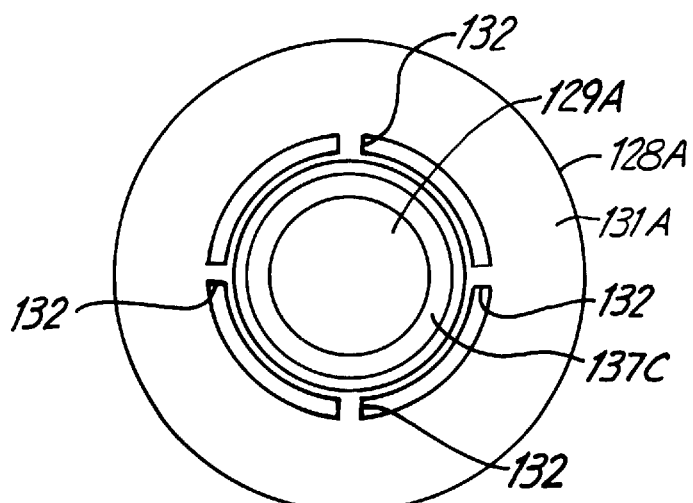
Figure 13:
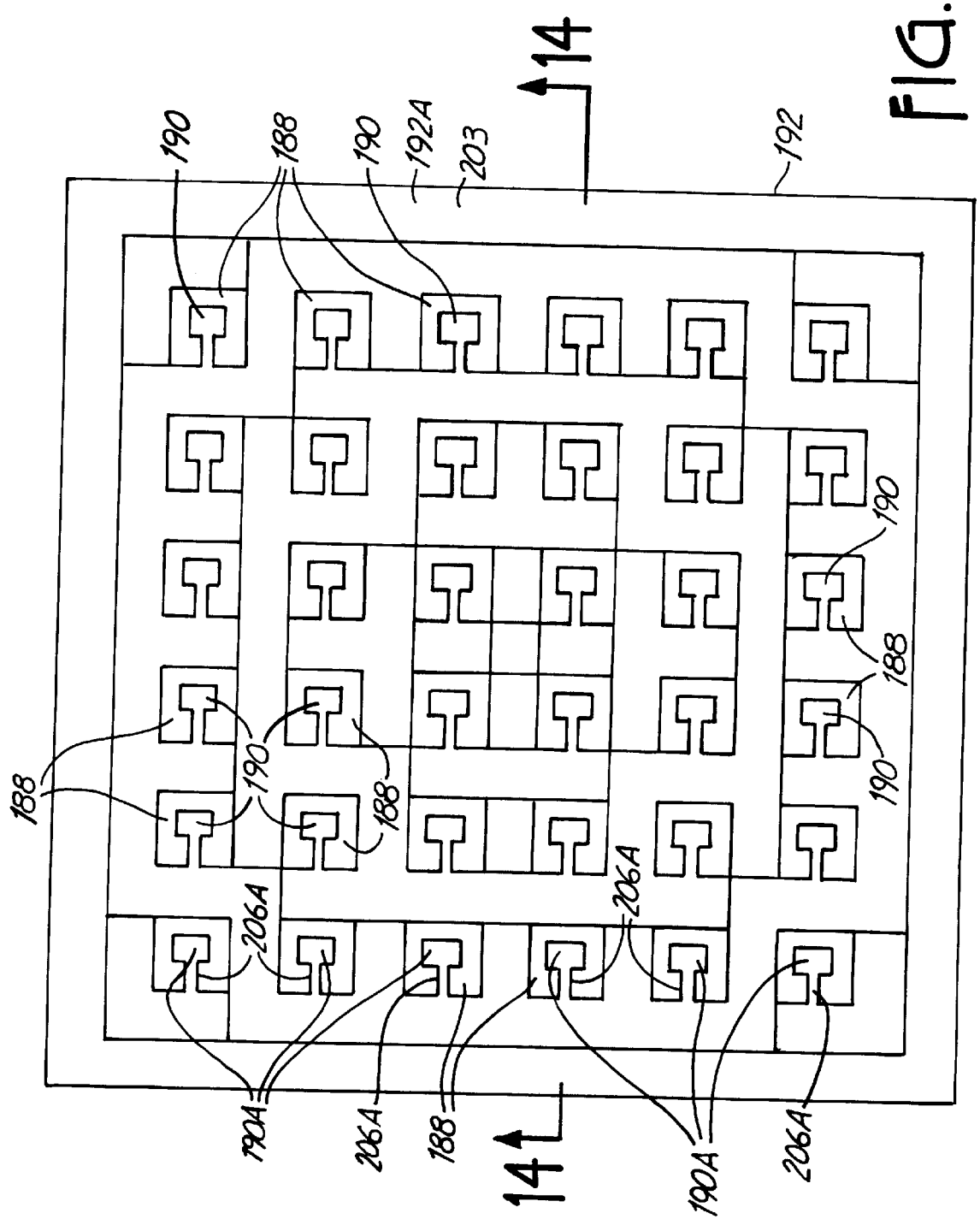
FIG. 13 is a top plan view of a pressure sensor in accordance with another embodiment.
Figure 14:
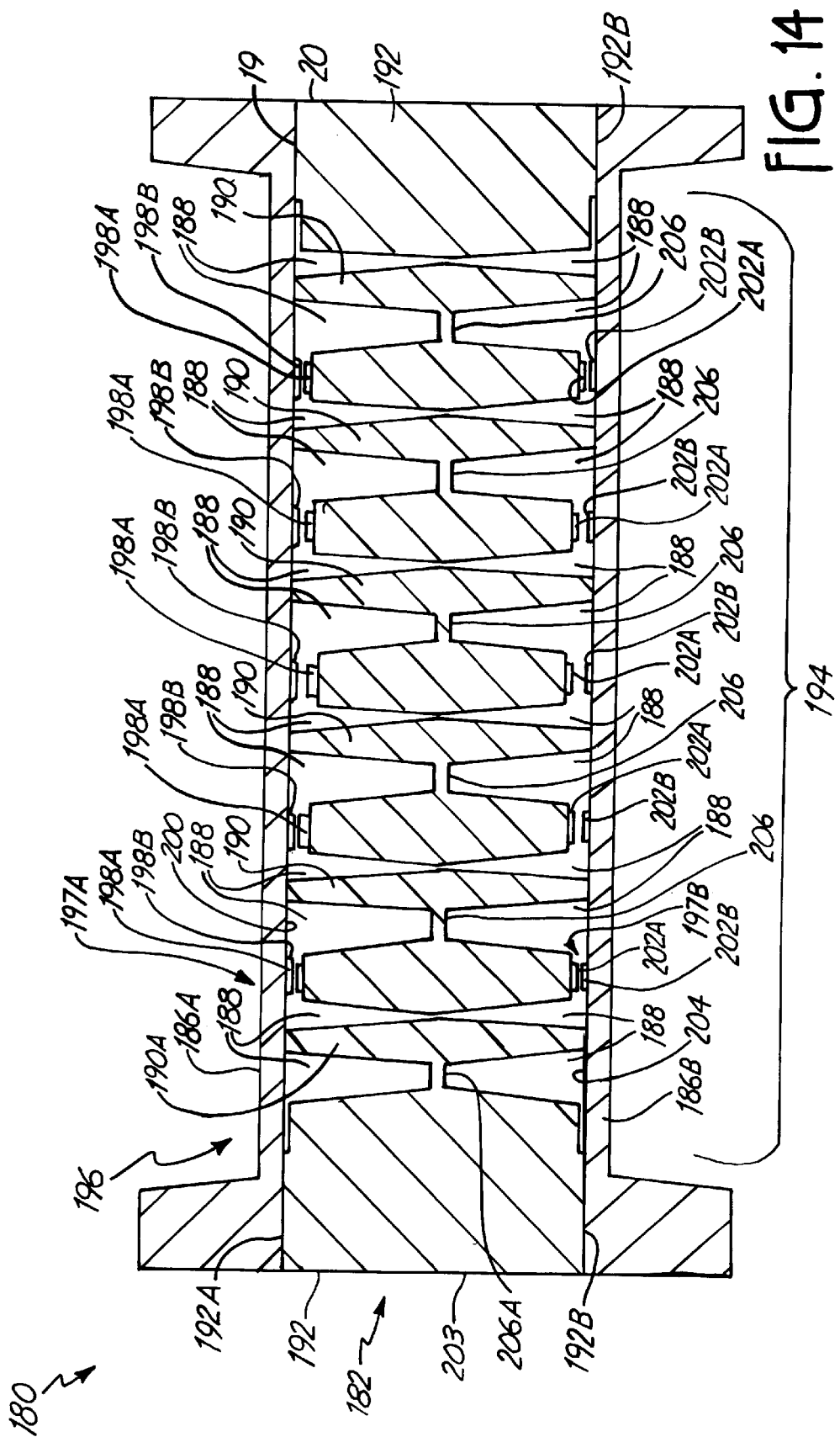
FIG. 14 is a side cross-sectional view of the pressure sensor of FIG. 13 taken along the line labeled 13—13.

Referring to FIGS. 12, 12A, 12B and 12C, the capacitor 135A includes a first electrode 137A formed on the diaphragm support structure 126, a second electrode 137B formed on the diaphragm support structure 126 and a third electrode 137C formed on the portion 129A of the isolator diaphragm 128A As illustrated in FIG. 12C, the electrodes 137A–137C form two capacitors 139A and 139B The capacitors 139A and 139B together are equivalent to a single capacitor that has a capacitance which varies in response to displacement of the coupling member 130 relative to the diaphragm support structure 126.

In the embodiment illustrated, the electrode 137C comprises a metallized-ring formed about the portion 129A. The electrode 137C faces the electrodes 137A arid 137B, which are illustrated in FIG. 12B. Conductive leads 141A and 141B of electrodes 137A and 137B, respectively, extend through recesses 143A and 143B in the diaphragm support structure 126. By forming series connected capacitors 139A and 139B in the manner described above, the capacitor 135B has output terminals (the conductive leads 141A and 141B) formed on the same surface.

The capacitive sensing device 136B is formed similar to the capacitive sensing device 136A. A first electrode 145A is provided on the diaphragm support structure 126, a second electrode 145B is provided on the diaphragm support structure 126 and a third electrode 145C is provide on the portion 129B.

In an alternative embodiment, the diaphragm support structure 126 includes substantially identical base members 148A and 148B that are secured together on planar surfaces represented by dashed line 149.

Pressure receiving end caps 134A and 134B form another aspect of the present invention. Referring to pressure receiving end cap 134A, a stress relieving annular groove or recess 150A separates the pressure receiving end cap 134A into a flexing assembly 151A and an outer periphery or rim 153A. The flexing assembly 151A comprises a plate portion 154A, a cylindrical tube 155A that joins the plate portion 154A to the outer rim 153A, and a center coupling member 156A that joins the plate portion 154A to the portion 129A of the isolator diaphragm 128A. Preferably, as illustrated, the plate portion 154A, the cylindrical tube 155A and the center coupling member 156A are integrally formed with the outer rim 153A by use of a second annular recess 159A. FIG. 12D illustrates, in plan view, the pressure receiving end cap 134A. The pressure receiving end cap 134B is formed substantially identical to the pressure receiving end cap 134A wherein an annular groove 150B provides a flexing assembly 151B and an outer rim 153B. Similarly, a second annular groove 159A forms a plate portion 154B, a cylindrical tube 155B and a center coupling member 156B.

The pressure receiving end caps 134A and 134B provides stress isolation and deflection amplification. O-rings 162A and 162B, or other suitable connection means such as a braze, engage the outer rims 153A and 153B, respectively, and provide seals to contain the process fluids exerting the pressure $P_1$ and $P_2$, respectively. Stress isolation is provided because the flexing assemblies 151A and 151B can move with respect to outer rims 153A and 153B. Deflection amplification occurs due to compression of the center coupling members 156A and 156B along with corresponding deflection of the cylindrical tubes 155A and 155B.

The diaphragm support structure 126, the isolator diaphragms 128A and 128B and the pressure receiving end caps 134A and 134B can be formed from any of the materials discussed above with respect to the previous embodiments. In a preferred embodiment, the pressure receiving end caps 134A and 134B are formed from Lucalox®, a polycrystalline aluminum ceramic material, available from GE Company of Fairfield, Connecticut. The Lucalox® is less expensive then other materials, such as sapphire. In addition, this material can be cast or machined.

Figure 15:
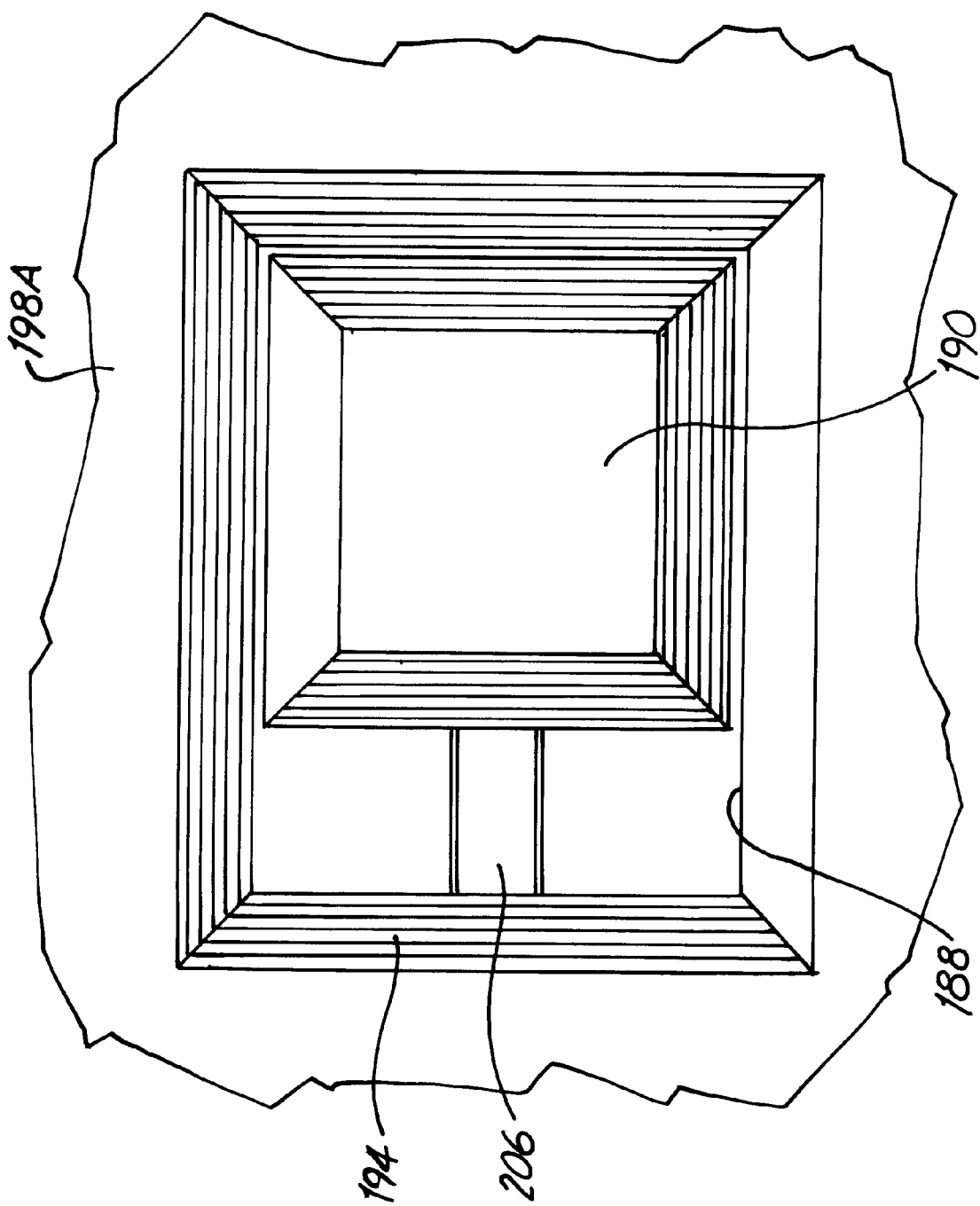
FIG. 15 is an enlarged plan view of a portion of the pressure sensor of FIG. 13.

FIGS. 13, 14, 15 and 16 illustrate a sixth embodiment of an oil-less pressure sensor of the present invention generally indicated at 180. Generally, the oil-less pressure sensor 180 includes a diaphragm support structure 182 and isolator diaphragms 186A and 186B that receive pressures $P_1$ and $P_2$, respectively. The diaphragm support structure 182 includes a plurality of apertures 188 through which rigid coupling members 190 extend and are secured to the isolator diaphragms 186A and 186B. FIG. 15 is an enlarged plan view of a single aperture 188 and a single coupling member 190. Referring back to FIG. 14, the isolator diaphragms 186A and 186B are further secured to an outer periphery 192 on surfaces 192A and 192B, respectively.

An overstop member 194 is formed within the diaphragm support assembly 192 under movable portions of the isolator diaphragms 186A and 186B. The overstop member 194 includes the plurality of apertures 188 through which the rigid coupling members 190 extend. A suitable sensing device 196 is provided to measure displacement of isolator diaphragms 186A and 186B relative to the overstop member 194. In the embodiment illustrated, the sensing device 196 comprises two capacitors 197A and 197B. The capacitor 197A includes an electrode 198A formed on at least a portion of the overstop member 194 facing the isolator diaphragm 186A. Preferably, the electrode 198A surrounds many of the plurality of the apertures 188 on the overstop member 194. A movable electrode 198B is formed on a surface 200 of the isolator diaphragm 186A, preferably in a pattern about the apertures 188 corresponding to the pattern of the electrode 198A on the overstop member 194. Suitable channels are recessed below the surface 192A in an outer periphery or rim 203 to allow conductive leads of the electrodes 198A and 198B to extend to an outer edge of the diaphragm support structure 192.

A capacitor 197B is formed in a manner similar to the capacitor 197A to measure displacement of the isolator diaphragm 186B relative to the overstop member 194. An electrode 202A, similar to electrode 198A is provided on a surface of the overstop member 194 to face an inner surface 204 of the isolator diaphragm 186B. A second electrode 202B is formed on the inner surface 204 of the isolator diaphragm 186B and faces the electrode 202A. Suitable channels are provided in the outer periphery 203, allowing conductive leads from the electrodes 202A and 202B to extend to the outer edge of the diaphragm support structure 192.

Like the embodiment of FIGS. 8 and 9, thin webs generally indicated at 206 hold the rigid coupling members 190 in position during fastening of the isolators diaphragms 186A and 186B to the rigid coupling members 190. For purposes of explanation, a subset of webs 206A of the plurality of webs 206 extend from the outer periphery 203 and are integrally formed with the a subset of rigid coupling members 190A of the plurality of rigid coupling members 190. In the embodiment illustrated, the remaining rigid coupling members 190 are held in position by the webs 206 extending from other portions of the overstop member 194. The position of the webs 206 along the length of the rigid coupling members 190 can be varied as desired; however, positioning the webs 206 at the center of each coupling member 190 may be preferable in order to maintain symmetry of the rigid coupling member 190 during machining or etching when the diaphragm support structure 192 is made from a crystalline material such as sapphire. However, if the webs 206 are positioned closer to either end of the coupling members 190, stiffness may be reduced. In order to further reduce the stiffness of the oil-less pressure sensor 180, the webs 206 can be removed or broken after the isolator diaphragms 186A and 186B have been bonded to each of the rigid coupling members 190. Ultrasonic agitation or use of lasers can be used to remove the webs 206. If the webs 206 are positioned at one or both ends of each coupling members 190, the webs 206 may be removed easier.

As stated above, the diaphragm support structure 192 can be made from a crystalline material such as sapphire. Other suitable materials include ruby, zirconia, silicon, silicon-carbide ceramic, zirconium, oxide ceramic, cermet ceramic, spinels and metals such as stainless steel. In a preferred embodiment, the isolator diaphragms 186A and 186B are formed of the same material used for the diaphragm support structure 192, although this is not necessary. However, if the diaphragm support structure 192 and the isolator diaphragms 186A and 186B are made from different materials, it is preferable that the materials have similar thermal expansion coefficients in order to minimize stress induced effects.

Figure 16:
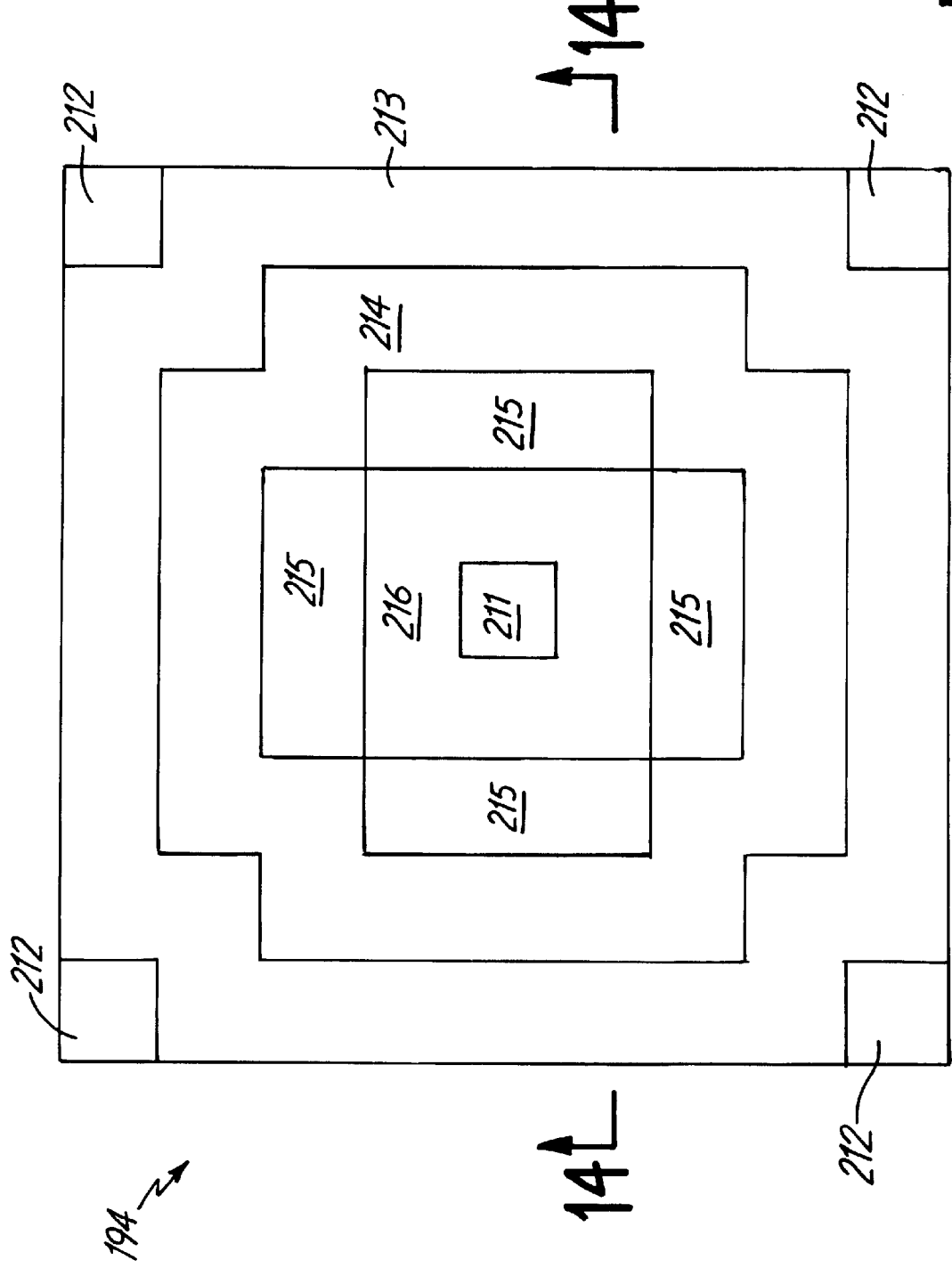
FIG. 16 is a graphical illustration of distances formed between components of the pressure sensor of FIG. 13.

Displacement of either the isolator diaphragms 186A or 186B is limited by contact with the overstop member 194. Although a distance between the inner surfaces 200 and 204 and corresponding surfaces of the overstep member 194 can be constant throughout, in a preferred embodiment, the distance varies approximately to the spherical deflection of the isolator diaphragms 186A and 186B. FIG. 16 graphically illustrates distances formed between the overstop member 194 and each of the isolator diaphragms 186A and 186B. In FIG. 16, the greatest distance is found at a portion 211, while the least distance is found at portions 212. Successively increasing distances are provided between the overstep member 194 and each of the isolator diaphragms 186A and 186B wherein specifically a portion 213 has a distance greater than portions 212; a portion 214 has a distance greater than portion 213; a portion 215 has a distance greater than portion 214; and a portion 216 has a distance greater than portions 215, but less than portion 211. It should be noted that the coupling members 190 have ends that are coplanar with surfaces 192A and 192B, which simplifies fabrication.

Figure 17:
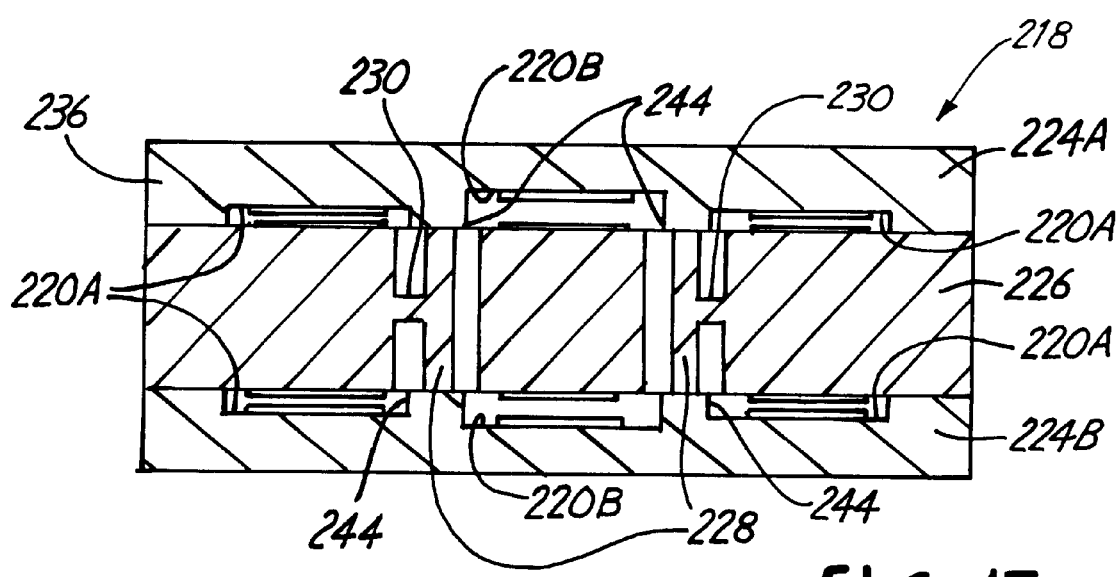
FIG. 17 is a side cross-sectional view of a pressure sensor in accordance with another embodiment.

FIG. 17 illustrates an alternative embodiment of an oil-less pressure sensor 218 where recessed surfaces 220A and 220B of varying depth are provided in the isolator diaphragms 224A and 224B. In this embodiment, surfaces of a diaphragm support structure 226 and ends of rigid coupling members 228 are also substantially coplanar.

These structures can be fabricated using any appropriate technique. Various machining, etching and deposition techniques are known in the art and may be used to fabricate the pressure sensor.

Figure 18:
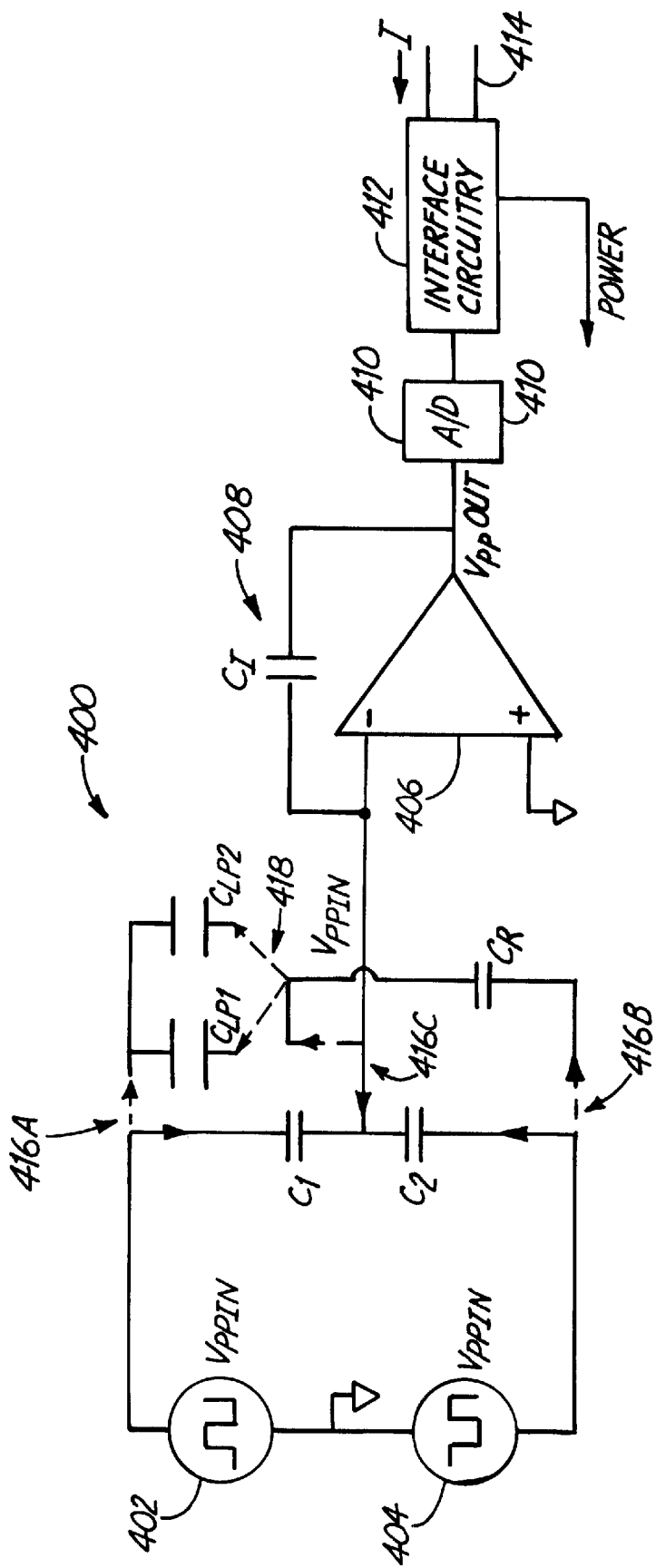
FIG. 18 is a simplified schematic diagram of a pressure transmitter.

Each of the above-described embodiments of an oil-less differential pressure sensor of the present invention includes electrodes forming at least the equivalent of two capacitors to form the difference in pressure between $P_1$ and $P_2$. FIG. 18 is a simplified schematic diagram of a pressure transmitter having a circuit 400 for sensing the differential pressure applied to any of the above-described pressure sensors. The circuit 400 includes the first capacitor $C_1$, for example, capacitor 31, and a second capacitor $C_2$, for example, capacitor 33. The capacitor $C_1$ is driven by a square wave generator 402, while the capacitor $C_2$ is driven by a square wave generator 404. An inverting input of a low noise differential amplifier 406 is connected to the undriven plates of capacitors $C_1$ and $C_2$, and a non-inverting input of the differential amplifier 406 is connected to electrical ground. The differential amplifier 406 has negative feedback through a capacitor 408 and has charge $\Delta Q$ from capacitors $C_1$. and $C_2$ flowing in and out of the inverting input. The output of the differential amplifier 406 is a square wave representative of differential capacitance, which is converted into a digital format by A/D converter 410. In circuit 400, $\Delta Q$ is given as:

$$\Delta Q = V_{PPIN} (C_1 - C_2) \qquad \text{EQ. 1}$$

And, the amplifier output is:

$$V_{PPOUT} = \Delta Q / C_2 = V_{PPIN} (C_1 - C_2/C_f) \qquad \text{EQ. 2}$$

Circuit 400 is but one suitable circuit for measuring capacitance of the capacitors $C_1$ and $C_2$. Other known circuits can also be used.

The output from converter 410 is provided to interface circuitry 412. Interface circuitry 412 is connected to a 4–20 mA current loop 414 and provides the digital signal A/D converter 410 to the current loop 414 in either a digital or analog format. Interface circuitry 412 also provides power to circuit 400 from the current loop 414. Interface circuitry 412 is also capable of receiving commands, such as those pursuant to the HART® communications standard.

Circuit 400 can also be used to measure the capacitance of the line pressure capacitors. In FIG. 18, capacitor $C_{LP1}$ represents the capacitor used to measure pressure $P_1$, while capacitor $C_{LP2}$ is used to measure pressure $P_2$. To measure line pressure, analog switches 416A and 416B and 416C are operated so as to connect the line pressure capacitors $C_{LP1}$ and $C_{LP2}$ and a known reference capacitor $C_R$ to the square wave generators 402 and 404 and the differential amplifier 406. Analog switch 418 is operated in order to initiate measurement of capacitor $C_{LP1}$ or $C_{LP2}$. Of course, the afore-mentioned equations apply wherein $C_1$ is replaced by either $C_{LP1}$ or $C_{LP2}$ and $C_2$ is replaced by $C_R$.

Figure 19:
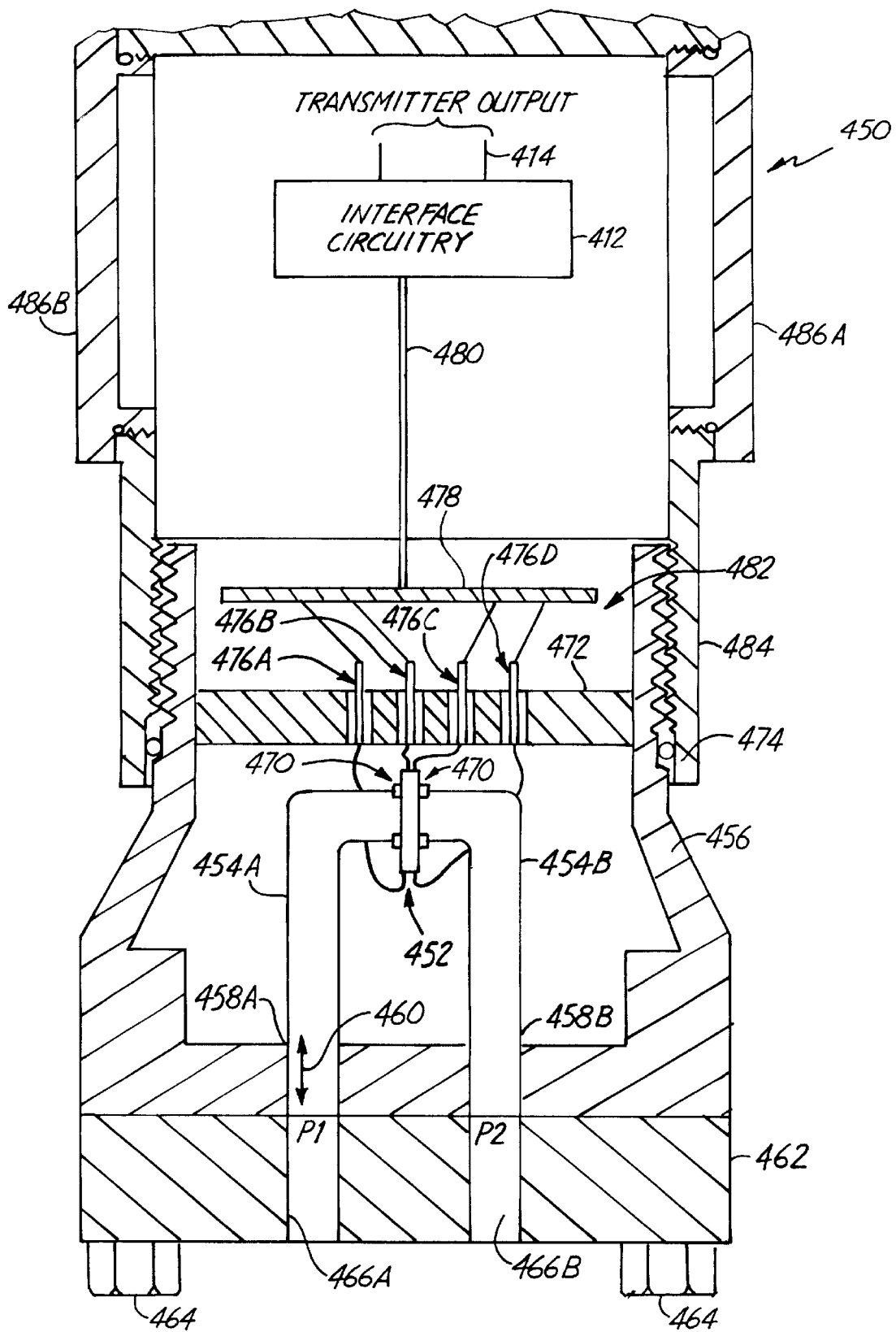
FIG. 19 is a side cross-sectional view of a pressure transmitter.

FIG. 19 illustrates a pressure transmitter 450 suitable for supporting any previously described oil-less differential pressure sensors of the present invention. In this Figure, an embodiment of the oil-less differential pressure sensor of the present invention is indicated at 452. Pressures $P_1$ and $P_2$ are fluidly coupled directly to the pressure sensor 452 by suitable tubes 454A and 454B respectively. The tubes 454A and 454B are relatively long compared to their diameters so as to provides stress isolation between the pressure sensor 452 and a housing member 456. Preferably, the tubes 454A and 454B are made of a suitably corrosion proof material, which has a thermal expansion coefficient similar to the pressure sensor 452. If, for example, the pressure sensor 452 is made of sapphire, the tubes 454A and 454B can be made of sapphire, aluminum oxide, or a suitable metal or metal alloy.

The tubes 454A and 454B are secured to the housing member 456 by suitable corrosion resistant brazes, indicated at 458A and 458B. A path length indicated by double arrow 460 is preferably long enough to provide corrosion resistance. The brazes 458A and 458B can be further protected by an electroplated coating of a highly corrosion resistant metal such as platinum or iridium. A process connector or flange 462 is secured to the housing member 456 with suitable fasteners indicated at 464. The flange 462 includes fittings 466A and 466B connectable to process lines carrying the process fluids to be measured.

The tubes 454A and 454B are attached to the pressure sensor 452 with a corrosion resistant connection indicated at 470. The corrosion resistant connection 470 can be a braze wherein an inner surface off the braze, exposed to the process fluids, is protected by electroplated platinum, iridium, or other suitable metal. The corrosion resistant connection 470 can also be a fusion bond between the sensor 452 and the tubes 454A and 454B. In addition, the corrosion resistant connection 470 can also be a fired sol-gel based coating of a ceramic material, such as aluminum oxide sol-gel used to make a joint between the sensor 452 made of sapphire and the tubes 454A and 454B made of sapphire or aluminum oxide.

A particular advantage of the oil-less differential pressure sensor and corresponding pressure transmitter of the present invention, is that no intermediate isolator diaphragms are required to measure the pressures $P_1$ and $P_2$. This significantly simplifies design and reduces manufacturing costs.

A process barrier 472 is mounted within the housing member 456 to form a cavity 474 that prevents process fluid from escaping the housing member 456, should any fluid connection fail. The cavity 474 can be a vacuum, filled with an inert gas, or filled with another suitable material. Feed-throughs 476A, 476B, 476C and 476D provide electrical pathways across the process barrier 472, connecting the pressure sensor 452 to a circuit board 478. If desired, two of the leads from the pressure sensor 452 can be made common, which would then only require three feed-throughs. If the pressure sensor 452 includes line pressure sensors, additional feed-throughs may be necessary.

Circuit board 478 receives electrical signals from the pressure sensor 452 related to pressures $P_1$ and $P_2$. The circuit board 458 includes differential amplifier 406, A/D converter 410 and other suitable devices to digitize and process these signals. The circuit board 478 communicates pressure information to the interface circuitry 412 using a data bus 480. The circuit board 478 is supported in an upper portion 482 of the housing member 456. A second housing member 484 mates with the housing member 456 to form an enclosure. Removable covers 486A and 486B provide access to the interface circuitry 412 when desired.

Although the present invention has been described with reference to preferred embodiments, workers skilled in the art will recognize that changes may be made in form and detail without departing from the spirit and scope of the invention.

What is claimed is:

1. A pressure sensor for measuring a pressure difference between two fluids, the pressure sensor comprising:
   a diaphragm support member having an outer periphery and an opening formed therethrough;
   a first diaphragm covering one side of the opening through the support member;
   a second diaphragm covering the other side of the opening through the support member; and
   a moveable member extending through the opening and coupled between the first and second diaphragms, wherein the moveable member moves in response to a difference between pressures applied to the first and second diaphragms.

2. The pressure sensor of claim 1 wherein the first and second diaphragms are joined to the outer periphery of the diaphragm support member.

3. The pressure sensor of claim 1 including an electrode on the first diaphragm and an electrode on the diaphragm support member and wherein deflection of the first diaphragm causes a change in capacitance between the first and second electrodes.

4. The pressure sensor of claim 1 including a first electrode carried on the moveable member and a second electrode carried on the diaphragm support member and wherein a capacitance between the first and second electrode is related to movement of the moveable member within the diaphragm support member.

5. The pressure sensor of claim 2 including at least one additional electrode configured to have a capacitance which changes in response to a localized deflection in the first diaphragm.

6. The pressure sensor of claim 1 wherein the coupling member is joined to the outer periphery of the diaphragm support structure by a web, the web being recessed from opposed outwardly facing surfaces of the outer periphery.

7. The pressure sensor of claim 1 wherein the diaphragm support member includes a second web joining the coupling member to a different portion of the outer periphery.

8. The pressure sensor of claim 7 and wherein the diaphragm support member includes a support joined between the web and the outer periphery, the support being recessed from the outwardly facing surfaces.

9. The pressure sensor of claim 8 and further comprising a pair of capacitive displacement sensors to measure displacement of the diaphragms relative to the diaphragm support member, each capacitive displacement sensor comprising a first capacitor plate disposed on the support and a second capacitor plate disposed on a surface of the corresponding diaphragm facing the first capacitor plate.

10. The pressure sensor of claim 1 wherein the diaphragm support member includes a plurality of coupling members joined to the first and second diaphragms at opposite ends, each coupling member having a web joining the coupling member to the outer periphery.

11. The pressure sensor of claim 1 wherein the diaphragm support member includes an overstop member joined to the outer periphery and extending inwardly configured to limit movement of the first diaphragm.

12. The pressure sensor of claim 11 wherein the overstop member has opposed surfaces spaced-apart from each of the diaphragms.

13. The pressure sensor of claim 1 wherein diaphragm support member includes a recess and the portion of the first diaphragm deflects proximate the recess.

14. The pressure sensor of claim 12 and a sensing device for measuring deflection of the portion of the first isolator diaphragm.

15. The pressure sensor of claim 14 wherein the sensing device comprises a capacitive electrode disposed on the diaphragm support structure within the recess, and a second capacitive electrode disposed on the portion of the first isolator diaphragm and facing the first capacitive electrode.

16. The pressure sensor of claim 1 wherein the diaphragm support structure comprises sapphire.

17. The pressure sensor of claim 1 wherein the first and second diaphragms are coupled to the diaphragm support member by fusion bond.

18. A process transmitter including a pressure sensor in accordance with claim 1.

19. The pressure sensor of claim 1 wherein the first diaphragm and the moveable member are integral.

20. The pressure sensor of claim 1 wherein the first and second diaphragms are in direct contact with a process fluid.

21. A pressure transmitter in a process control system for measuring and sensing a pressure difference between two fluids, the transmitter comprising:

a pressure sensor comprising,
   a diaphragm support member having an outer periphery and a coupling member disposed inward of the outer periphery and joined to the outer periphery with a web, the web being recessed from opposed outwardly facing surfaces of the outer periphery; and first and second diaphragms disposed on opposite sides of the diaphragm support member, each diaphragm joined to the outer periphery and to the coupling member, and wherein the first diaphragm receives the first pressure and the second diaphragm receives the second pressure;

a sensing device operably coupled to the pressure sensor to provide an output signal indicative of a difference in pressure between the first pressure and the second pressure; and circuitry receiving the output signal and transmitting information on the loop.

22. The pressure transmitter of claim 21 wherein the sensing device comprises a capacitive sensing device.

* * * * *